United States Patent
Seguin

(10) Patent No.: US 6,352,388 B1
(45) Date of Patent: Mar. 5, 2002

(54) MARINE PIPELAY SYSTEM

(75) Inventor: Bruno Seguin, Westhill (GB)

(73) Assignee: Coflexip Stena Offshore Limited (GB)

( * ) Notice: Subject to any disclaimer, the term of this patent is extended or adjusted under 35 U.S.C. 154(b) by 0 days.

(21) Appl. No.: 09/424,621

(22) PCT Filed: Apr. 1, 1999

(86) PCT No.: PCT/GB99/01030

§ 371 Date: Nov. 24, 1999

§ 102(e) Date: Nov. 24, 1999

(87) PCT Pub. No.: WO99/50582

PCT Pub. Date: Oct. 7, 1999

(30) Foreign Application Priority Data

Apr. 1, 1998 (GB) .............................................. 9806974

(51) Int. Cl.[7] ................................................. F16L 1/19
(52) U.S. Cl. ..................... 405/166; 405/169; 405/170
(58) Field of Search ........................... 405/170, 169, 405/167, 166, 154, 158, 168.1, 168.2, 168.3, 168.4

(56) References Cited

U.S. PATENT DOCUMENTS

| | | | |
|---|---|---|---|
| 3,266,256 A | | 8/1966 | Postlewaite et al. |
| 3,440,826 A | | 4/1969 | Kline |
| 3,581,506 A | * | 6/1971 | Howard ...................... 405/166 |
| 3,585,806 A | | 6/1971 | Lawrence |
| 3,680,322 A | * | 8/1972 | Nolan, Jr. et al. .......... 405/166 |
| 3,860,122 A | * | 1/1975 | Cernosek ..................... 405/166 |
| 4,068,490 A | * | 1/1978 | Jegousse ..................... 405/166 |
| 4,486,123 A | * | 12/1984 | Koch et al. .................. 405/169 |
| 4,591,294 A | * | 5/1986 | Foulkes ........................ 405/170 |
| 5,421,675 A | | 6/1995 | Brown et al. |
| 5,464,307 A | | 11/1995 | Wilkins |

FOREIGN PATENT DOCUMENTS

| | | |
|---|---|---|
| FR | 2443008 | 6/1980 |
| FR | 2624246 | 6/1989 |

* cited by examiner

Primary Examiner—David Bagnell
Assistant Examiner—Frederick L. Lagman
(74) Attorney, Agent, or Firm—Ostrolenk, Faber, Gerb & Soffen, LLP

(57) ABSTRACT

A marine pipelay vessel equipped with a pipe laying apparatus comprising a pipe handler for moving the pipe into its raised launching position, a pipe connection station for connecting together pipe ends when in the launching position, a pipe support for maintaining the pipe in a raised position, a static clamp for releasably securing the upper end of a previously launched pipe, a pipe launcher for controllably launching the raised pipe stalk in which the pipe launcher comprises a second mobile clamp adapted to be releasably secured to the pipe such that the second clamp may be raised and lowered controllably over a predetermined stroke distance between the uppermost and the lowermost stroke position relative to the vessel. The pipe may be gripped alternatively by the first clamp and second clamp thus allowing the pipe to be launched from the vessel in a stepwise manner of a repeating cycle in which the first clamp is applied to the pipeline whilst the second clamp is being raised to its uppermost stroke position, then transferring the load of the pipeline from the first clamp to the second clamp, then lowering the second clamp to its lowermost stroke position.

26 Claims, 31 Drawing Sheets

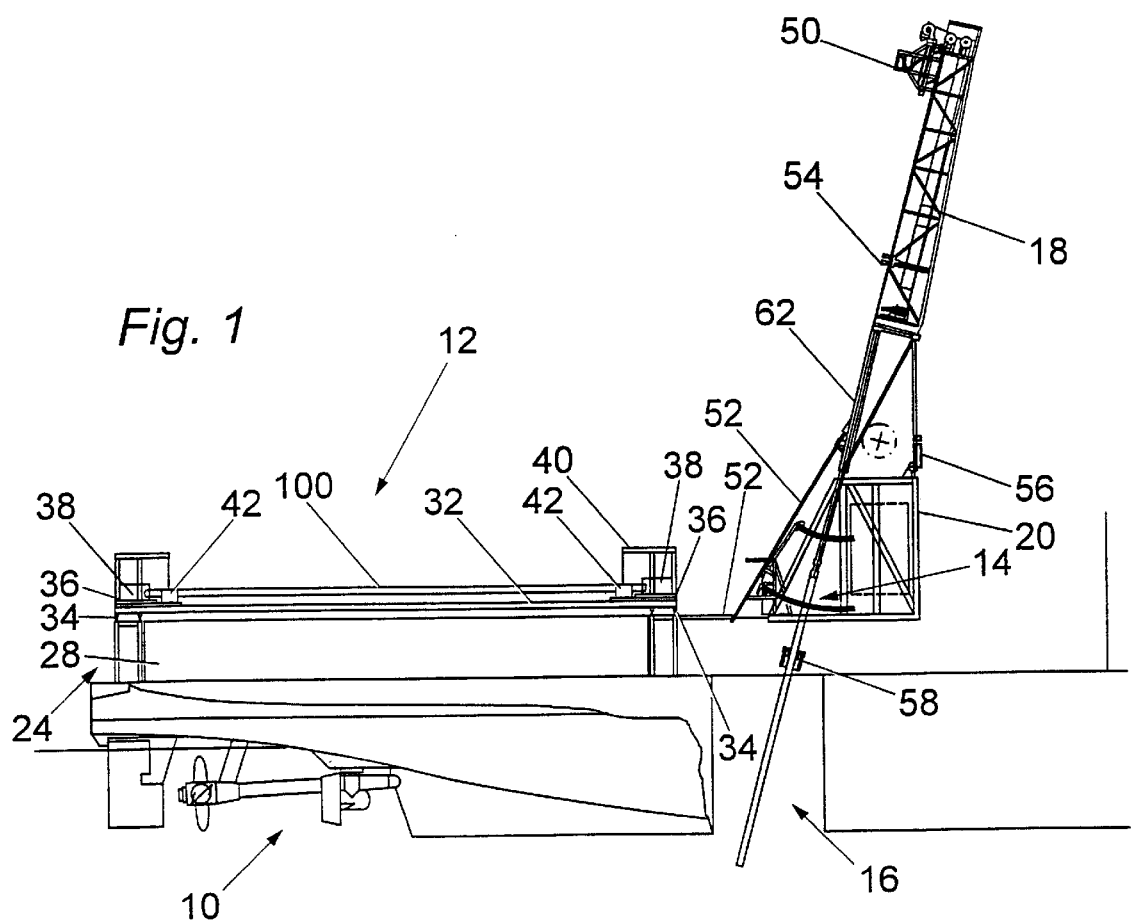
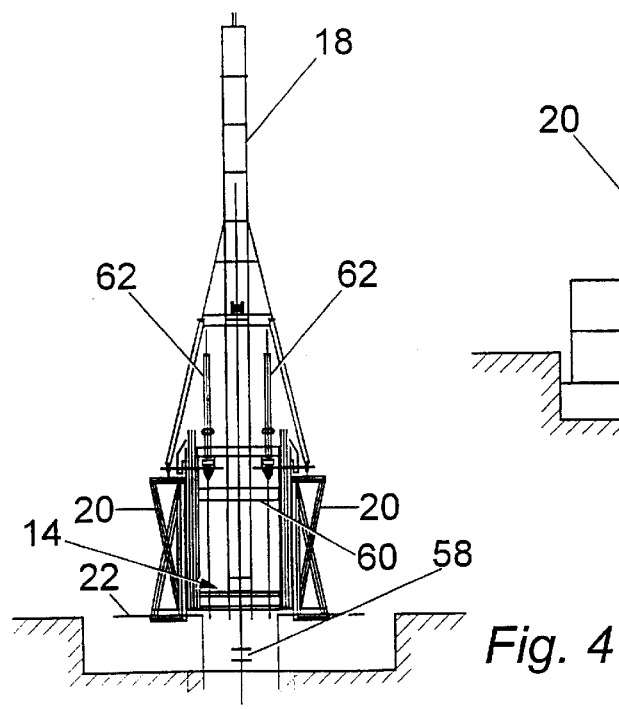
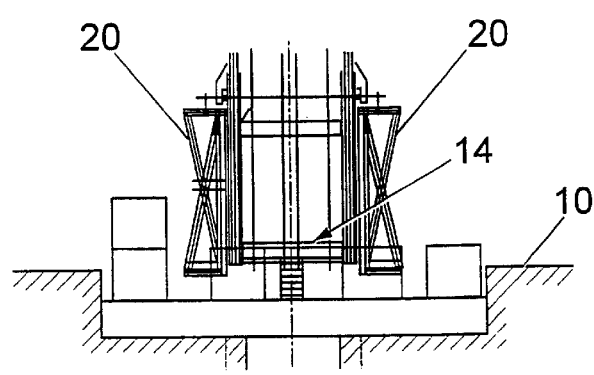

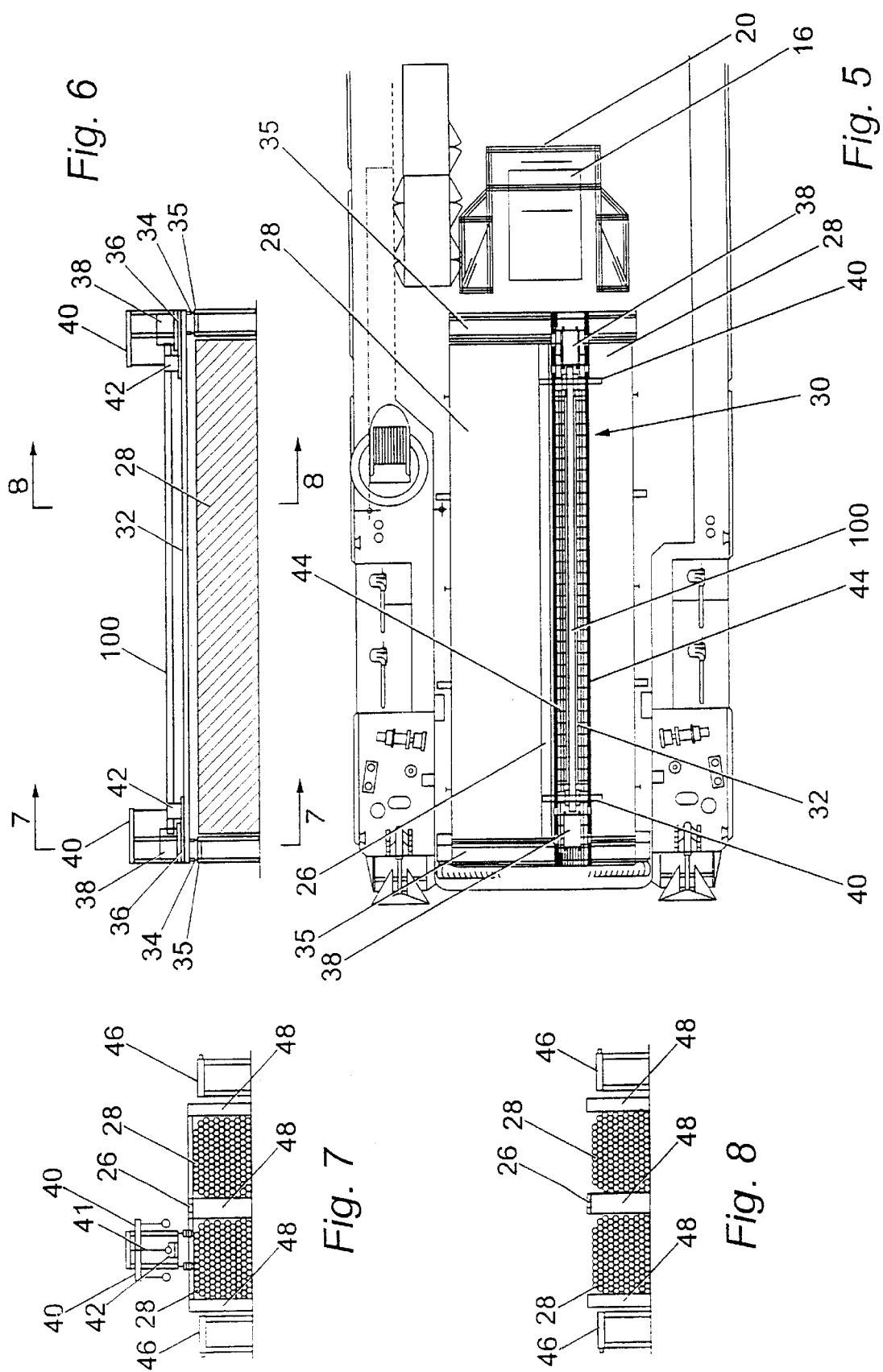

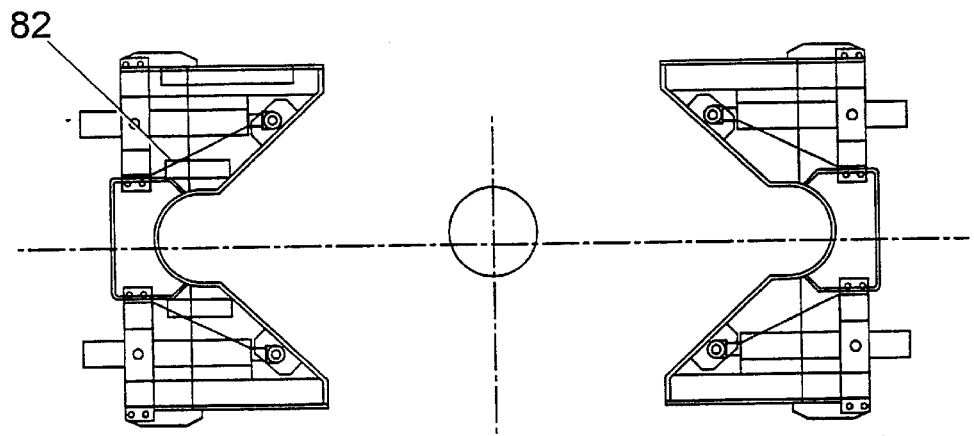
Fig. 16(a)
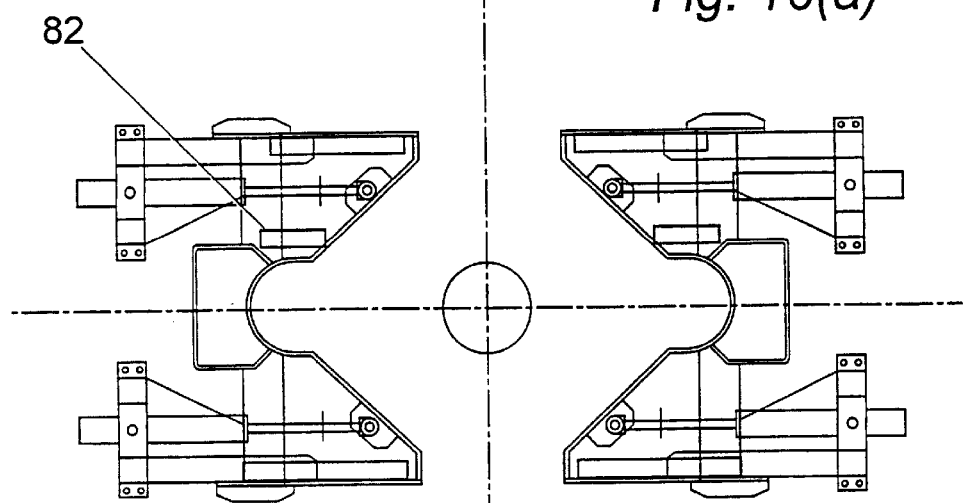
Fig. 16(b)
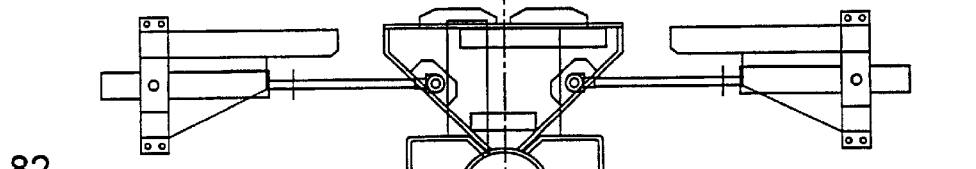
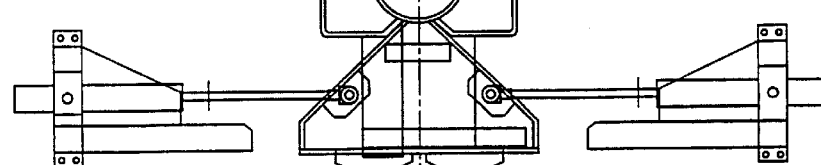
Fig. 16(c)

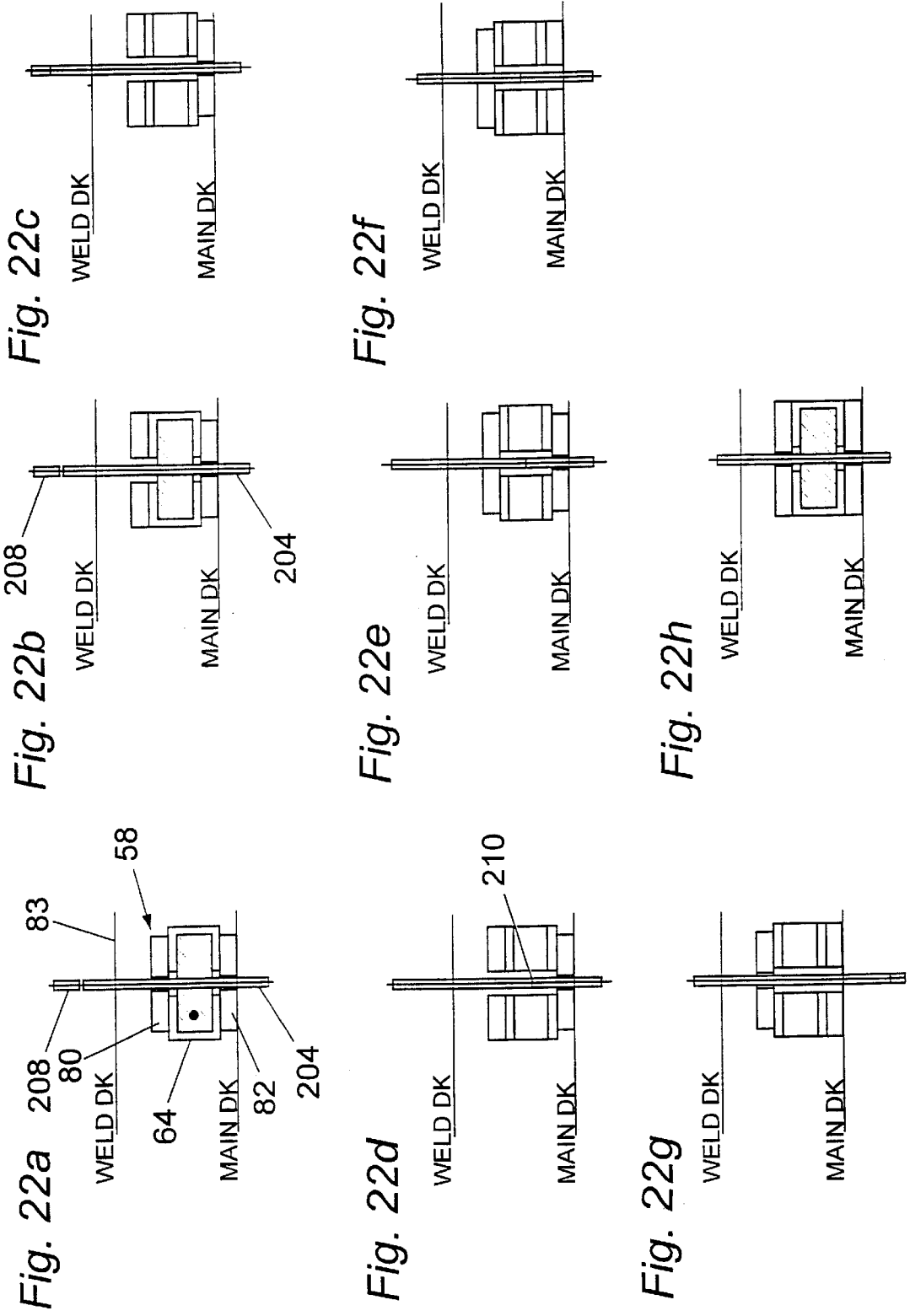

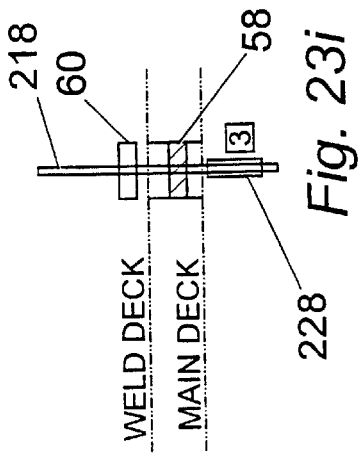
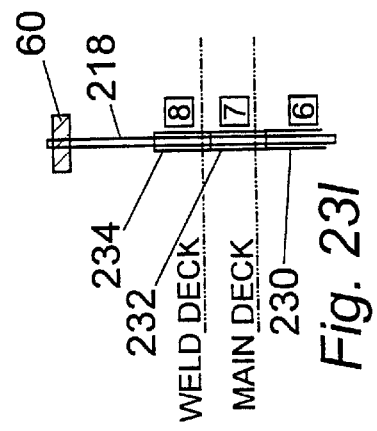
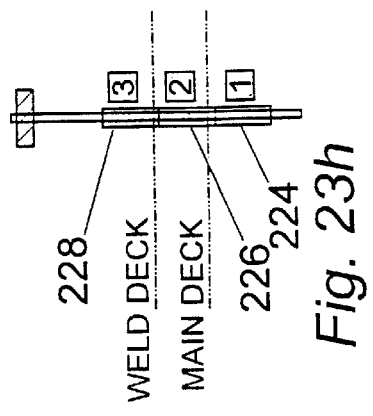
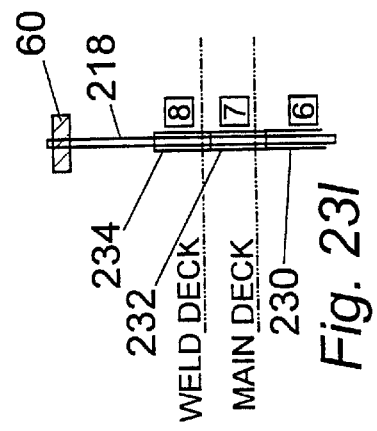
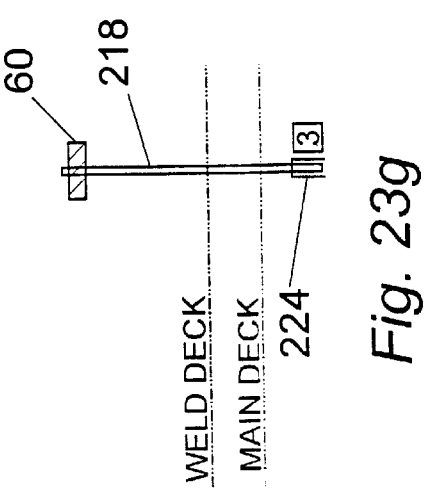
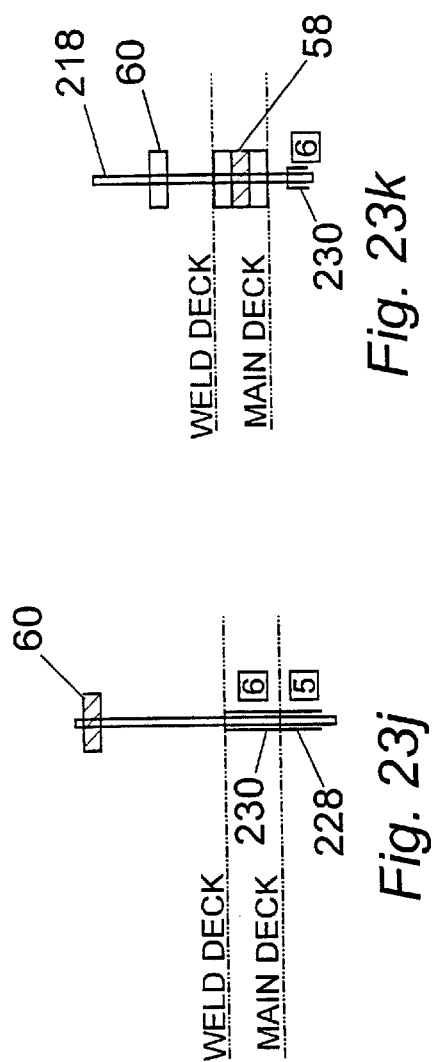

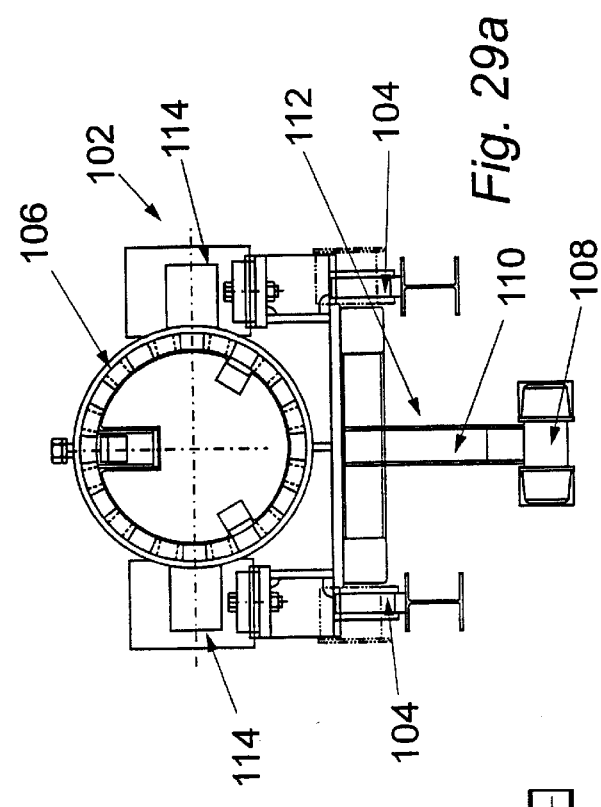
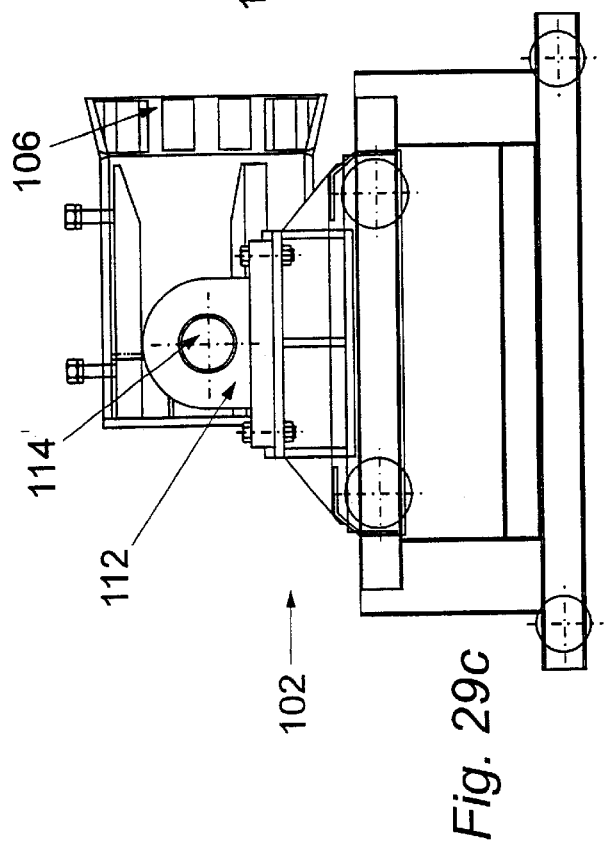
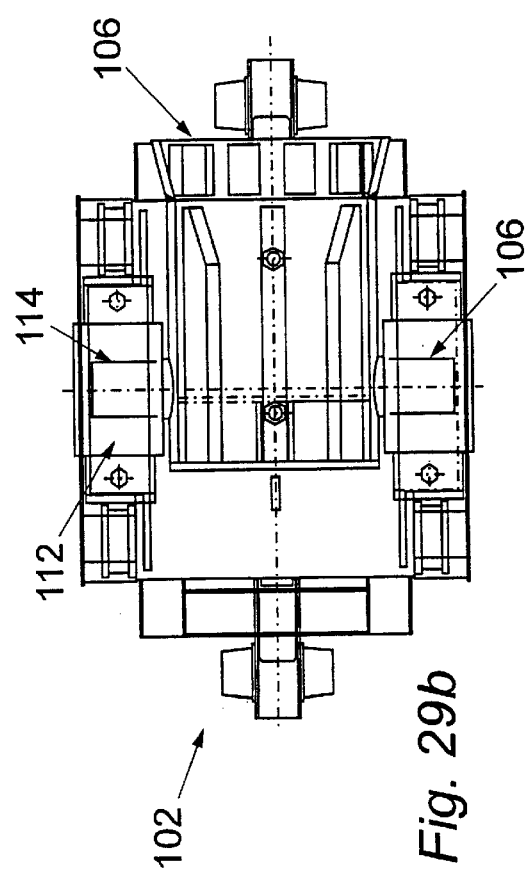
Fig. 29a
Fig. 29b
Fig. 29c

MARINE PIPELAY SYSTEM

The present invention relates to an improved method and apparatus for the laying of pipelines from marine vessels. The invention is particularly applicable to rigid pipelines.

The invention relates particularly to a pipelay system of the "J-Lay" type, in which lengths (or "stalks") of pipe are raised to a substantial angle to the horizontal before being launched into the water from the vessel. Typically, the pipe is welded into double joint sections, typically 24 m in length at an onshore location before being loaded onto the vessel. As pipelaying progresses, the lowermost end of the raised stalk is connected to the uppermost end of the previously launched pipe, typically by welding, before being launched into the water. The uppermost end of the previously launched pipe must be clamped in position while the new stalk is connected to it, and a mechanism is required for controllably launching the new stalk, along with the existing pipe, once the connection is complete and the clamp is released. Examples of J-Lay systems are disclosed in U.S. Pat. No. 3,266,256, U.S. Pat. No. 3,585,806, U.S. Pat. No. 5,421,675 and U.S. Pat. No. 5,464,307.

The present invention is concerned with providing an improved J-Lay system.

In accordance with a first aspect of the invention there is provided marine pipelay apparatus for use on a vessel, comprising:

a pipe connecting station including means for connecting a lowermost end of a raised pipe stalk to an uppermost end of a previously launched pipeline;

pipe support means comprising a tower extending upwardly above said pipe connecting station for maintaining a raised pipe stalk at an angle determined by a required lay line with its lowermost end aligned with said pipe connecting station;

first, static clamp means for releasably securing an uppermost end of a previously launched pipeline in alignment with said pipe connecting station; and pipe launching means for controllably launching said raised pipe stalk when said first clamp means is released; wherein:

said pipe launching means comprises second, mobile clamp means adapted to be releasably secured to the pipeline and elevator means whereby said second clamp means may be raised and lowered controllably over a predetermined stroke distance between a first, uppermost, zero stroke position and a second, lowermost, maximum stroke position, whereby the pipeline may be gripped alternately by said first and second clamp means, the pipeline being launched from the vessel in a stepwise manner by means of a repeating cycle comprising applying said first clamp means to the pipeline while the second clamp means is being raised towards its zero stroke position, transferring the load of the pipeline from the first clamp means to the second clamp means, and lowering the second clamp towards its maximum stroke position; and wherein:

said pipe connecting station, said tower and said pipe launching means are mounted on a main supporting structure adapted to be mounted at a main deck level of a vessel for fore/aft movement relative thereto and said static clamp means is mounted on a hang-off structure adapted to be mounted at said main deck level of said vessel for fore/aft movement relative thereto independently of said fore/aft movement of said main supporting structure.

Preferably, said mobile clamp means and said tower are pivotally mounted on said main supporting structure and said static clamp means is pivotally mounted on said hang-off structure.

Preferably also, said tower is mounted for pivotable movement about a first horizontal, port/starboard axis whereby said predetermined angle may be adjusted within a predetermined range, said mobile clamp means being mounted for pivotable movement about said first axis for alignment with said lay line, and said static clamp means is mounted for pivotable movement about a second horizontal, port/starboard axis parallel to said first axis.

Preferably, the static clamp means is located beneath said pipe connecting station and said mobile clamp means is located above the static clamp, the uppermost position of the mobile clamp being above the level of the pipe connecting station and the lowermost position of the mobile clamp being below the level of the pipe connecting station.

Preferably, said main supporting structure comprises a first support structure adapted to be mounted at said main deck level of said vessel, and a second support structure mounted on top of said first support structure, said tower, said pipe connecting station and said pipe launching means being mounted on said second support structure.

Preferably, said mobile clamp means includes a pipe clamping device mounted on a supporting beam structure and said elevator means comprises a plurality of hydraulic jacks connected to said supporting beam structure and operable to raise and lower said supporting beam structure relative to said static clamp means.

Preferably, said static and mobile clamp means are adapted to be split along respective transverse axes and retracted clear of said lay line.

Preferably also, said static and mobile clamp means are adapted to be partially retracted so as to provide a predetermined, limited clearance around said lay line.

Preferably, said tower means is adapted to support a first pipe stalk in a stand-by position extending substantially parallel to said lay line.

Preferably also, the apparatus further includes pipe-handling means adapted to raise a pipe stalk into said stand-by position and subsequently to shift said pipe stalk from said stand-by position into alignment with said lay line.

Preferably, the pipe handling means is adapted for raising a pipe stalk onto said tower.

Preferably also, said pipe-handling means includes a horizontal, elongate platform adapted to be located so as to extend in the fore/aft direction between the stern of the vessel and said main supporting structure, said platform being adapted to support a pipe stalk prior to said pipe stalk being raised onto said tower, pipe storage bays extending in the fore/aft direction on either side of said platform, and pipe lifting means comprising a traversing beam extending in the fore/aft direction and mounted for transverse port/starboard movement above said platform and said storage bays, said traversing beam including pipe hoisting means adapted to lift pipe from both the port and starboard sides of said traversing beam between said pipe storage bays, said traversing beam and said platform.

Preferably also, said traversing beam includes pipe preparation means mounted thereon.

Preferably also, said pipe preparation means includes pipe bevelling machines mounted on said beam at either end thereof for forming welding bevels on either end of a pipe stalk supported on said traversing beam, said bevelling machines being adapted for fore/aft movement along the length of said traversing beam.

Preferably also, said platform includes a first pipe transporting trolley mounted for fore/aft movement along the length of said platform and including pipe clamping means for engaging and supporting a first end of a pipe stalk at a sternmost end thereof.

Preferably, said pipe clamping means is adapted for pivotable movement about a horizontal port/starboard axis.

Preferably also, said pipe-handling means includes a pipe-hoisting device which is adapted to be raised and lowered relative to said pipe supporting means, said device including:

pipe hoisting means;

a main body portion adapted for connection to said pipe hoisting means;

pipe clamping means connected to said main body portion and adapted to engage an outer surface of one end of a pipe stalk, said pipe clamping means being adapted for pivotable movement relative to said main body portion about a horizontal port/starboard axis;

a housing mounted on said main body portion and including winch means adapted for connection to an internal line up clamp (ILUC), such that said ILUC may be stored in said housing and deployed therefrom, through said clamping means and along the interior of a pipe stalk gripped by said clamping means.

Preferably also, said clamping means and housing are connected to said body portion by actuating means operable to effect movement of said clamping means and said housing relative to said body portion in a fore/aft direction between a first stand-by position and a second position in which said clamping means is aligned with said lay line.

In accordance with a second aspect of the invention, there is provided a marine pipelay vessel equipped pipelay apparatus in accordance with the first aspect of the invention.

Preferably, said lay-line extends through a moon-pool formed in the vessel.

In accordance with a third aspect of the invention, there is provided a marine pipelay method for laying a pipeline from a vessel utilising apparatus in accordance with the first aspect of the invention, the method comprising the steps of:

(a) raising a first pipe stalk to a required launch angle;

(b) lowering said first pipe stalk along said lay line until its uppermost end is aligned with said pipe connecting station;

(c) clamping said uppermost end of said first pipe stalk using said static clamp means;

(d) raising a second pipe stalk to said required launch angle and connecting its lowermost end to the uppermost end of said first pipe stalk;

(e) securing said mobile clamp means to said first pipe stalk at said first, uppermost position, releasing said static clamp means and operating said mobile clamp means to lower the first and second pipe stalks until the mobile clamp means reaches said second, lowermost position, and repeating the foregoing steps, if required, until the upper end of the second pipe stalk is aligned with the pipe connecting station;

(f) securing said static clamp means to the uppermost end of said second pipe stalk;

(g) releasing said mobile clamp means and returning said mobile clamp means to said first position;

(h) repeating steps (d) to (g) until the required length of pipeline has been laid.

Preferably, the steps of raising said pipe stalks include preliminary steps of raising said pipe stalks into a stand-by position in which the pipe stalk extends along an axis substantially parallel to but spaced from said lay line, and subsequently shifting the pipe stalk from said stand-by position into alignment with said lay line.

Preferably, the method includes an initial step of lifting the pipe stalks from a storage area onto a preparation platform and bevelling the ends of the pipe stalk prior to raising the pipe stalk to said required launch angle.

Preferably, a pipe stalk being lowered includes a projection greater than the outer diameter of the pipe and less than a predetermined diameter, wherein step (e) of the method defined above includes the following steps whereby said projection may be passed through said static clamp means when said static clamp means is released and said mobile clamp means is operated to lower the pipe stalk:

prior to the projection reaching the static clamp means, with the load of the pipe supported by the static clamp means, opening a first pipe guide located on top of the static clamp means to a retracted position providing sufficient clearance to pass said projection;

transferring the load of the pipe from the static clamp means to the mobile clamp means by engaging the mobile clamp means and releasing the static clamp means;

opening the static clamp means to a retracted position providing sufficient clearance to pass said projection;

operating said mobile clamp means to lower the projection to a position below said first pipe guide and within said static clamp means;

closing said first pipe guide;

opening a second pipe guide located beneath the static clamp means to a retracted position providing sufficient clearance to pass said projection;

operating said mobile clamp means to lower said projection to a position below said second pipe guide;

closing said second pipe guide, closing said first pipe guide and transferring the load of the pipe from the mobile clamp means to the static clamp means.

These and other aspects and preferred features of the invention will be described in the following description of embodiments of the invention.

Another known type of pipe-launching system in which the pipe is paid out in a step-wise manner using a first, static clamp and a second, travelling clamp is disclosed in EP-A-0522050 (Coflexip SA).

Embodiments of the invention will now be described, by way of example only, with reference to the accompanying drawings in which:

FIG. 1 is a side view of the aft portion of one embodiment of a pipelay vessel equipped with pipelaying apparatus in accordance with the invention;

FIG. 3 is a transverse sectional view, looking forward, of part of the pipelaying apparatus of FIG. 1;

FIG. 4 is a front view of a pipe support and launching structure of the vessel of FIG. 1;

FIG. 5 is a further plan view of the aft portion of the vessel of FIG. 1;

FIG. 6 is a side view of a pipe storage and preparation structure forming part of the pipelay apparatus in accordance with the invention.

FIG. 7 is a sectional view of line 7—7 of FIG. 6;

FIG. 8 is a sectional view on line 8—8 of FIG. 6;

Figure 13:
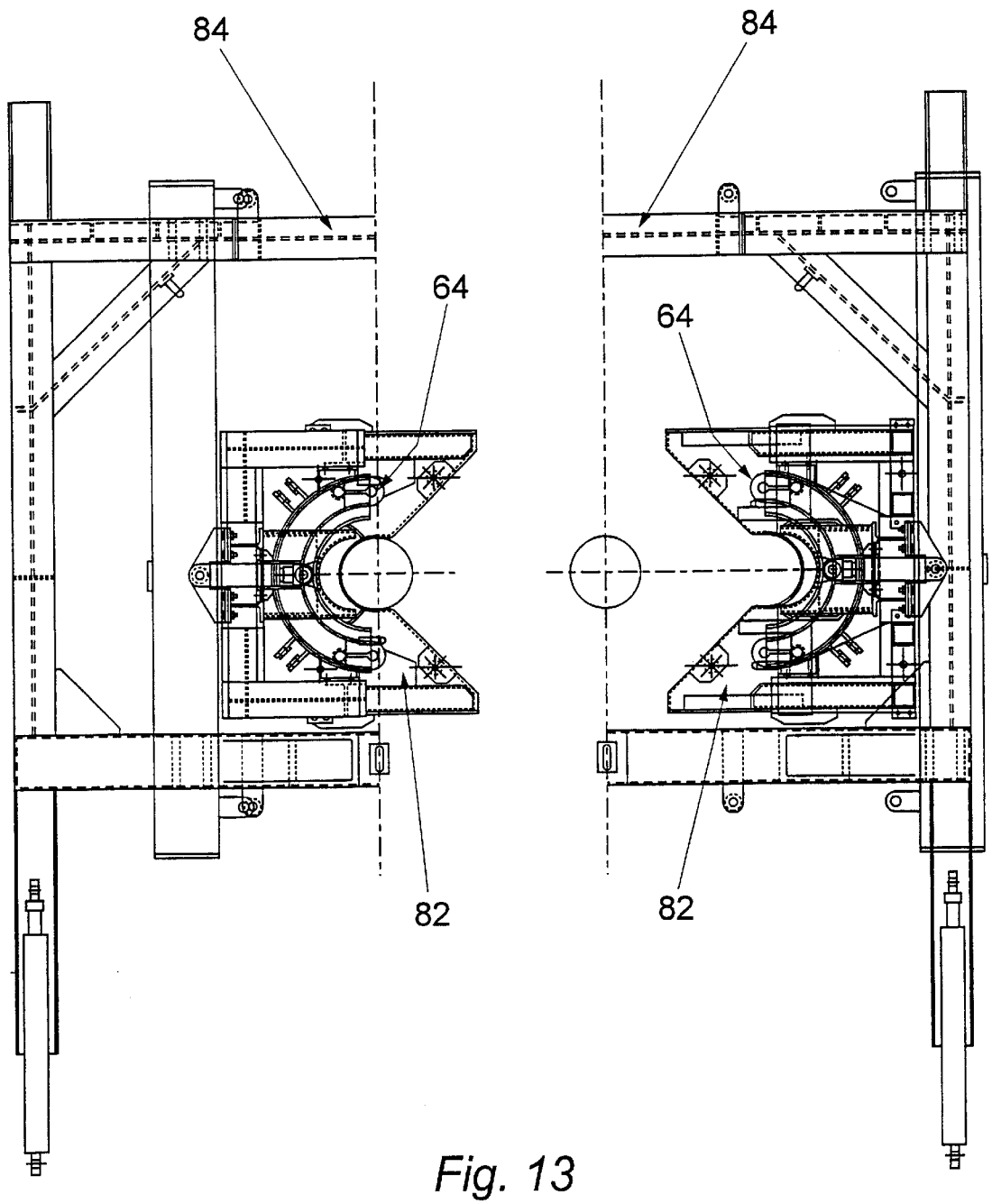
FIG. 13 is a plan view illustrating a first, static pipe clamping assembly forming part of the pipelay apparatus in accordance with the invention.
Figure 14:
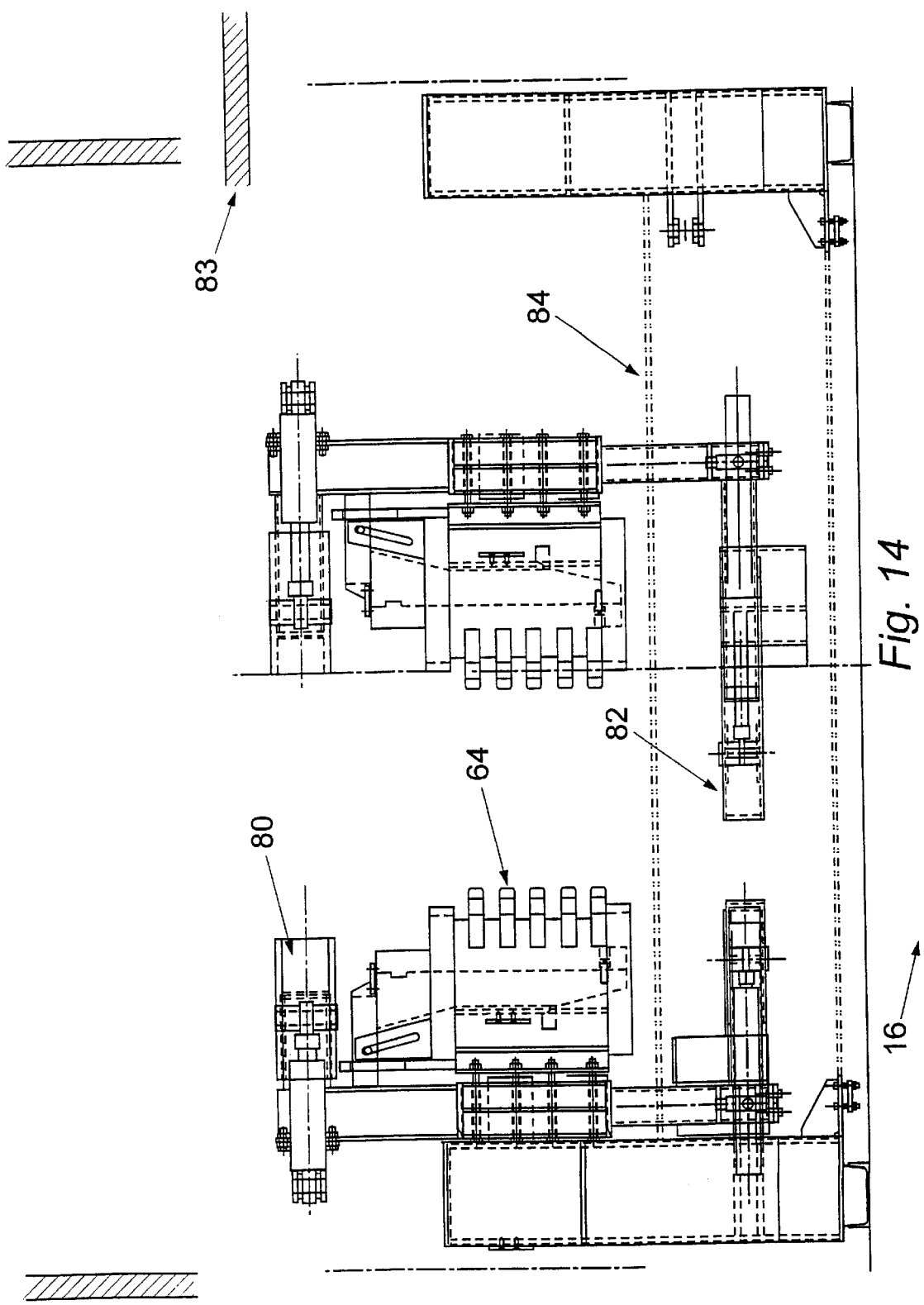
FIG. 14 is a side view, looking aft, of the pipe clamp assembly of FIG. 13.
Figure 15:
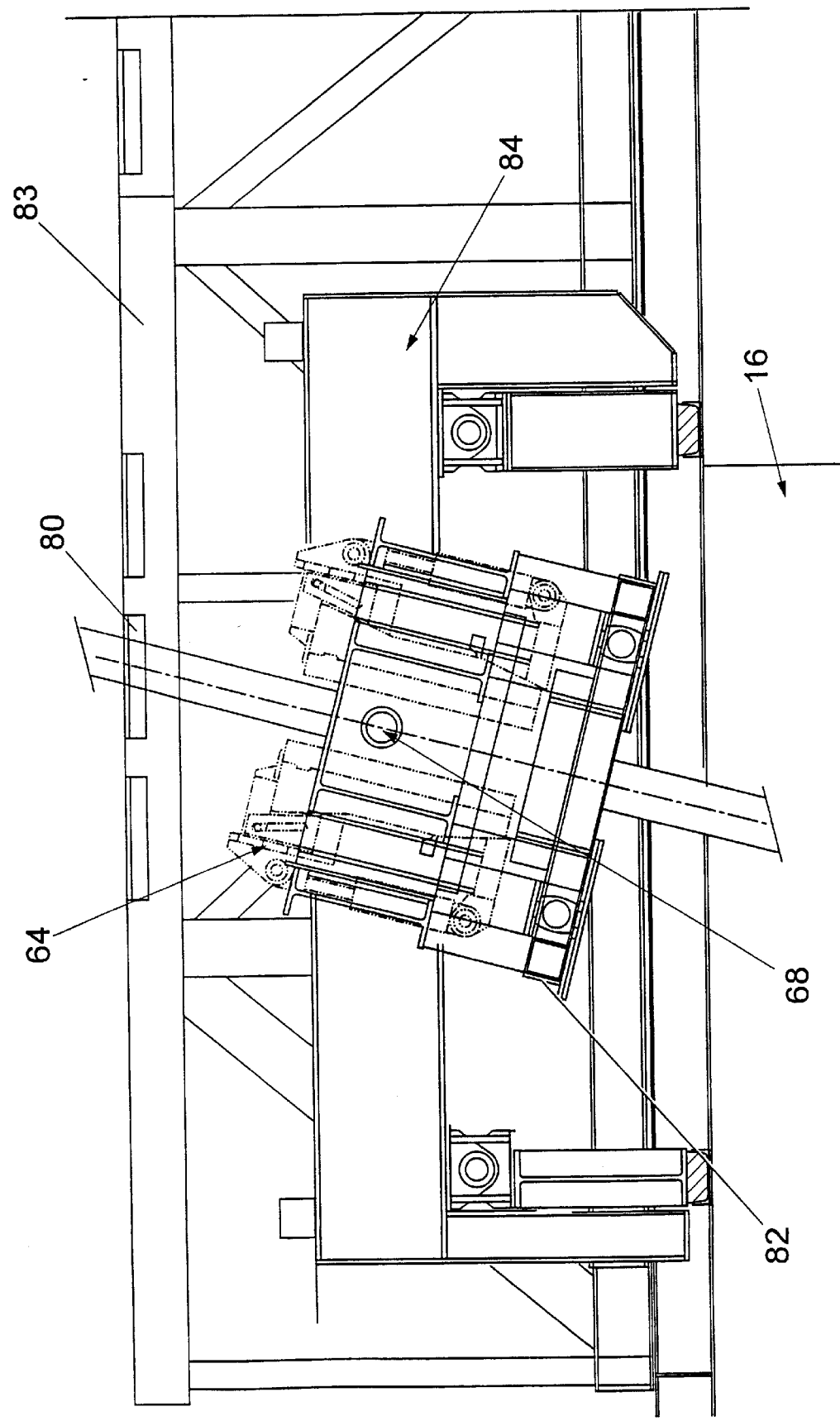
FIG. 15 is a side view, looking to port, of the clamp assembly of FIGS. 13 and 14.
Figure 16D:
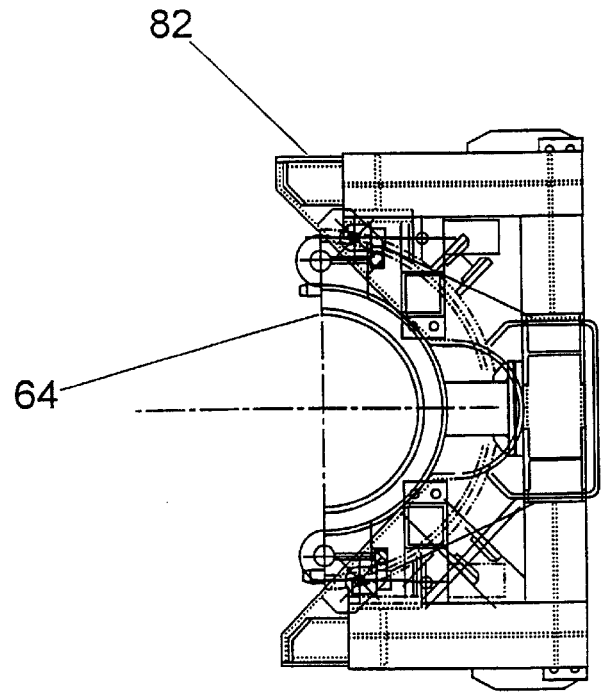
Figure 16E:
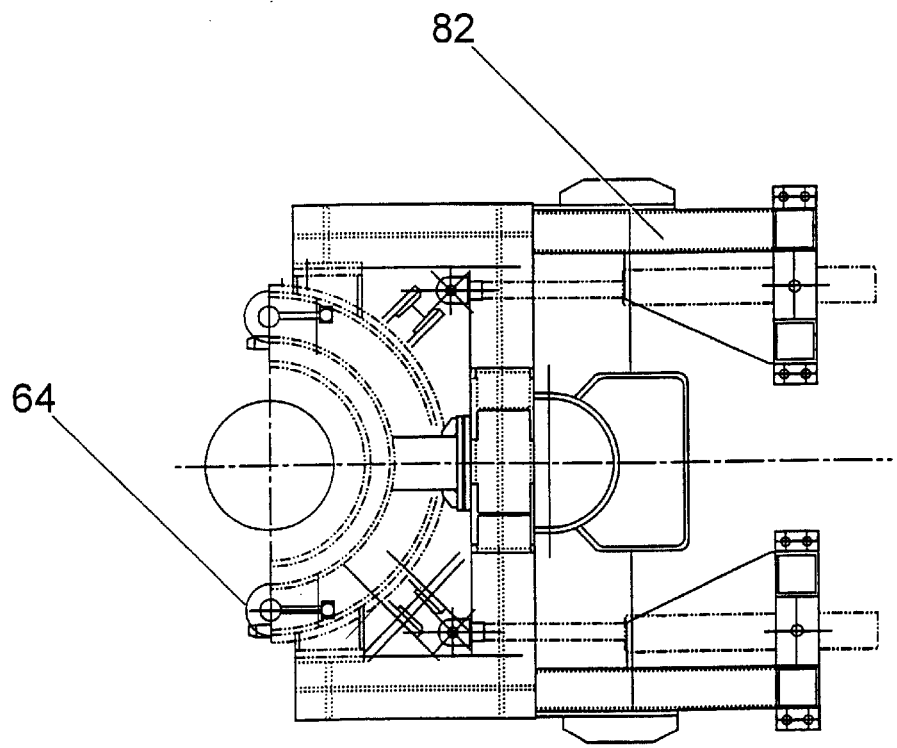
Figure 17A:
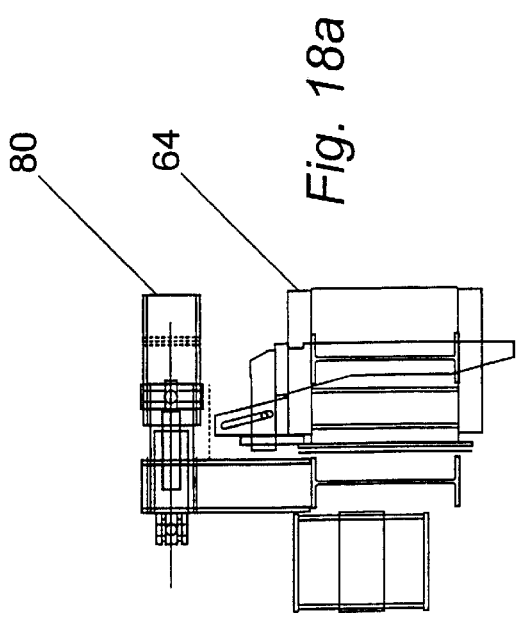
Figure 17B:
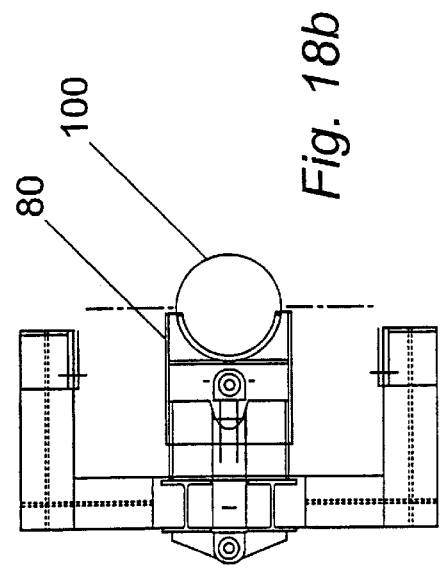
Figure 18A:
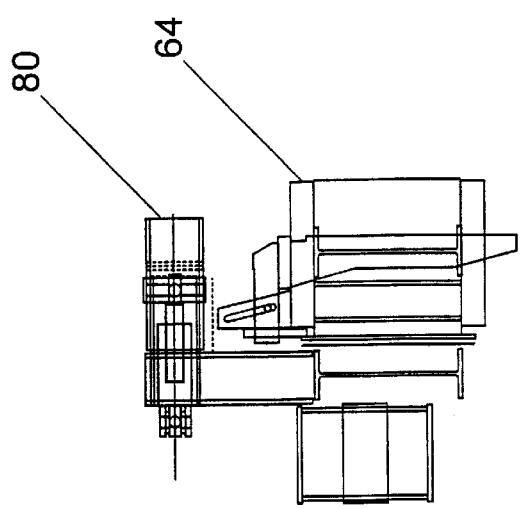
Figure 18B:
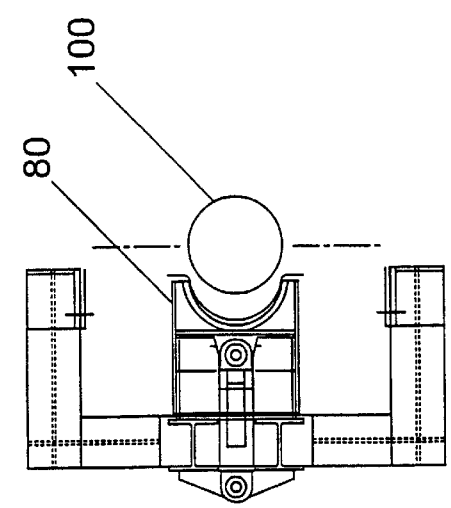
Figure 19B:
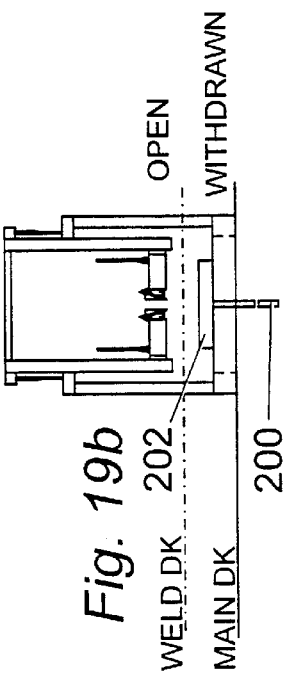
Figure 19A:
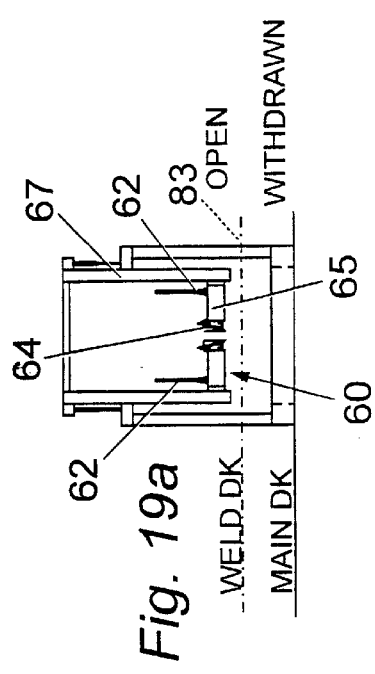
Figure 19C:
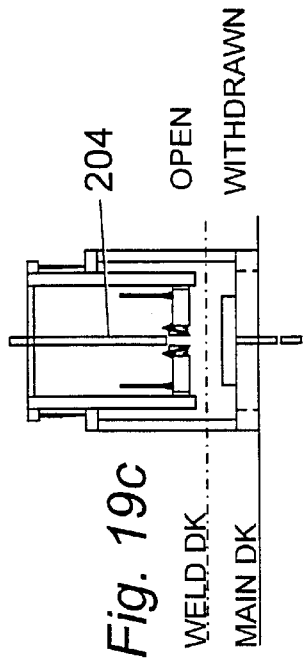
Figure 19E:
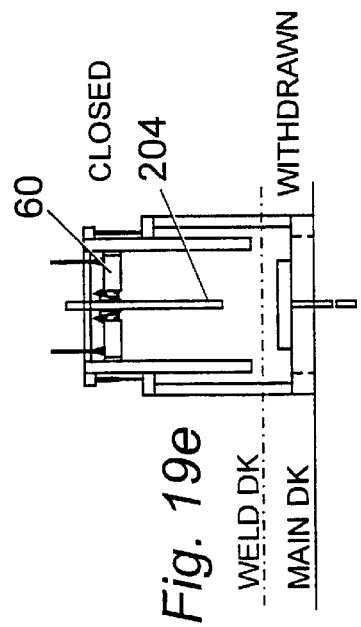
Figure 19D:
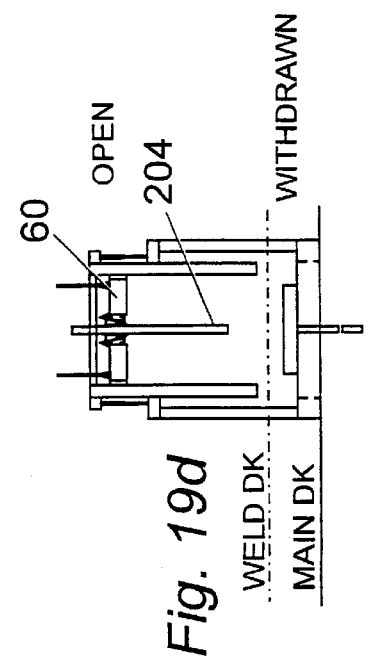
Figure 19G:
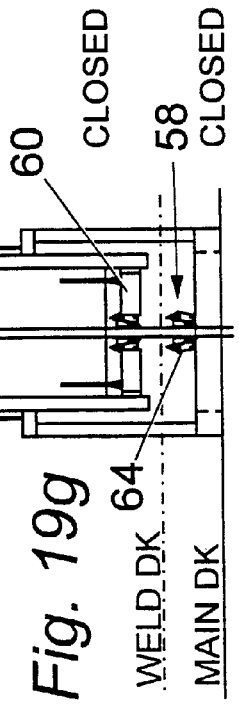
Figure 19F:
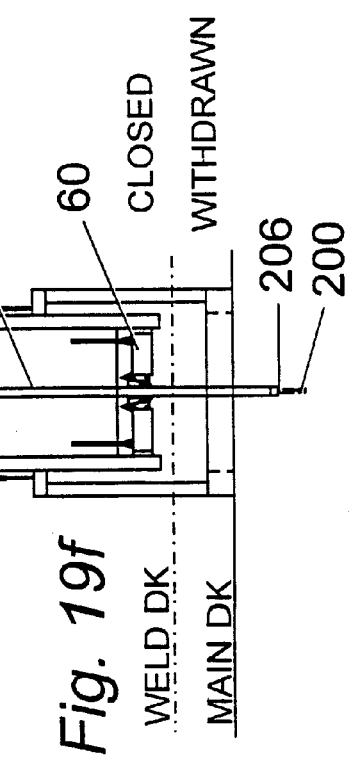
Figure 20A:
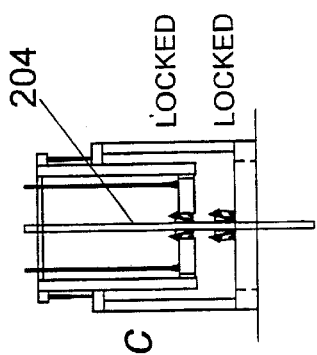
Figure 20B:
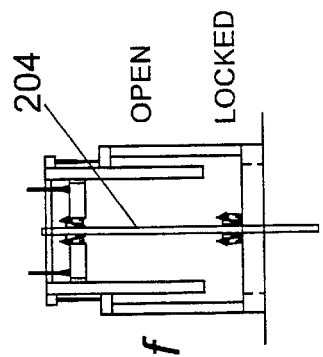
Figure 20C:
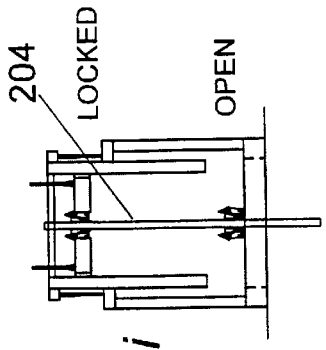
Figure 20D:
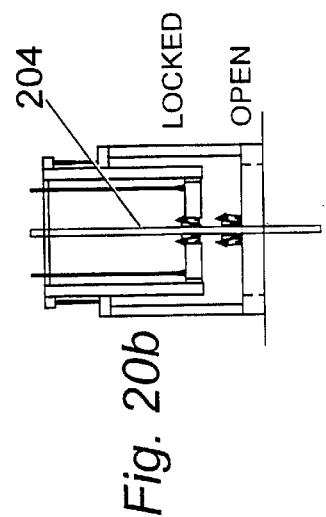
Figure 20E:
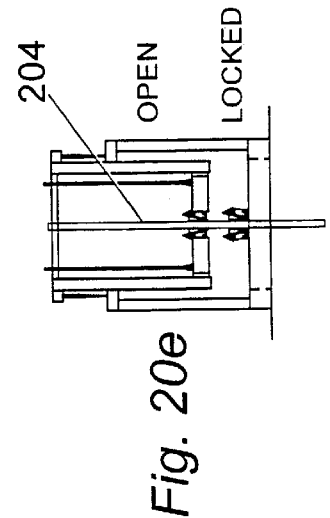
Figure 20F:
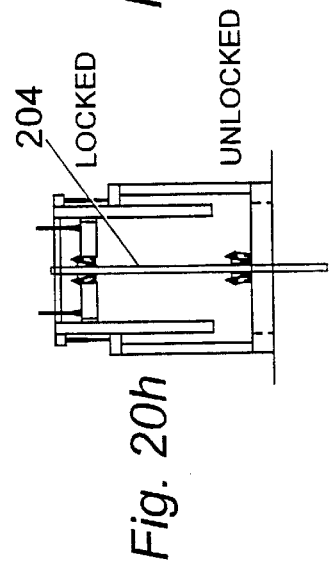
Figure 20G:
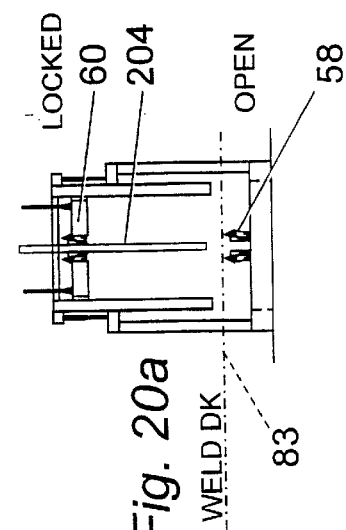
Figure 20H:
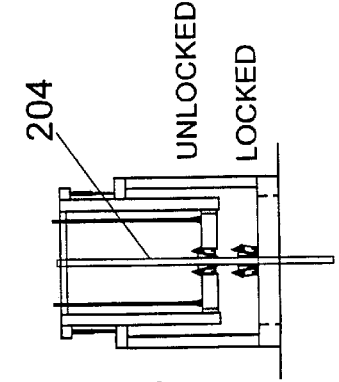
Figure 20I:
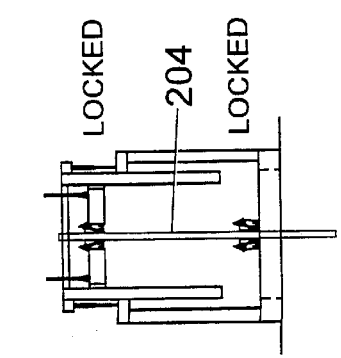
Figure 21A:
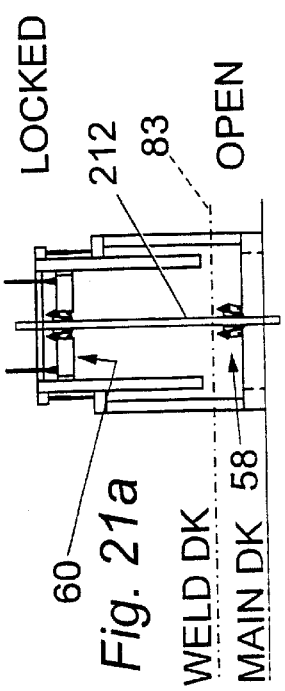
Figure 21B:
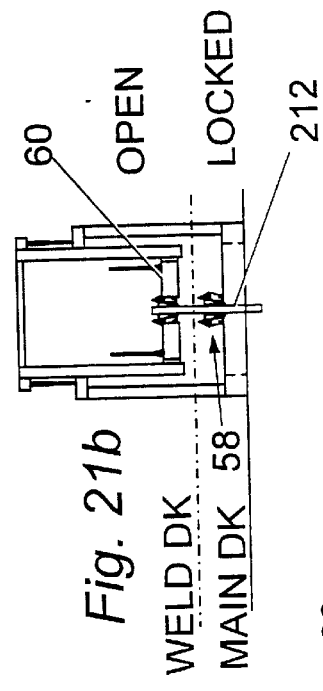
Figure 21C:
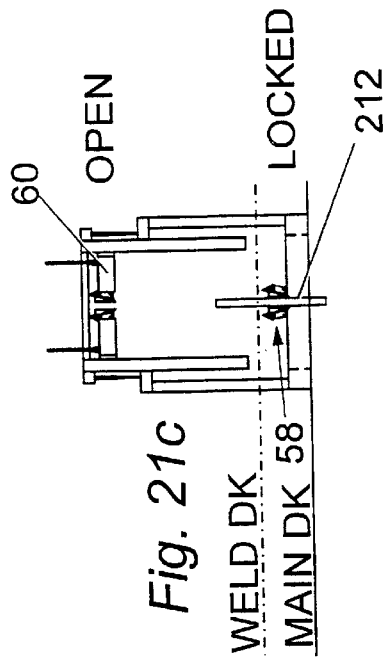
Figure 21D:
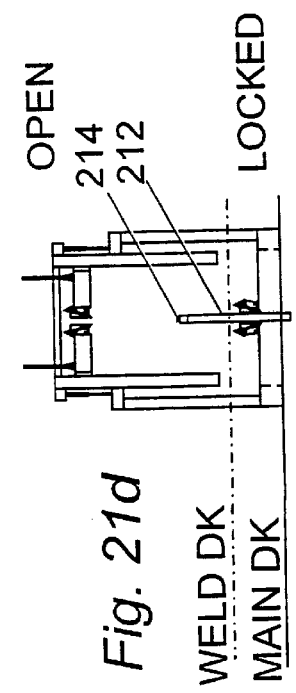
Figure 21E:
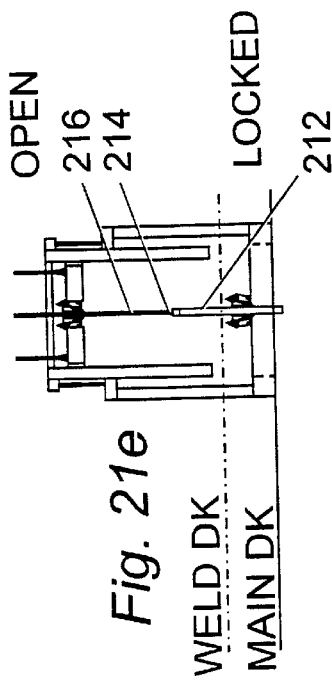
Figure 21G:
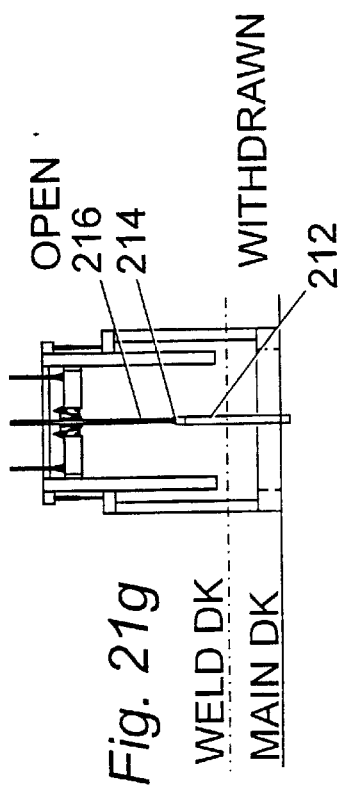
Figure 21F:
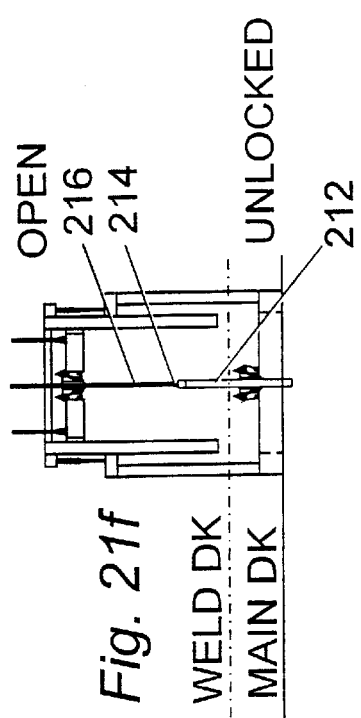
Figure 21H:
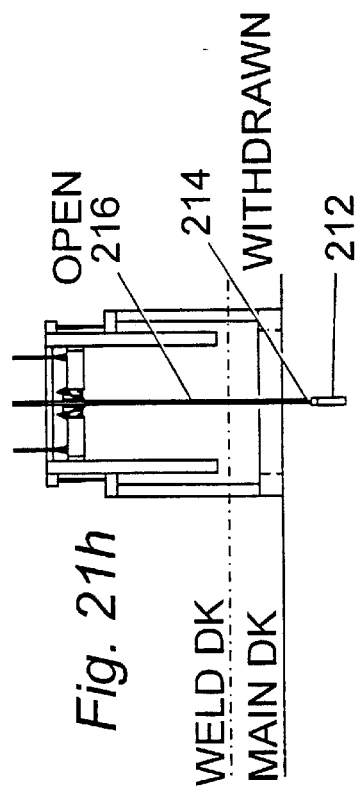
Figure 23A:
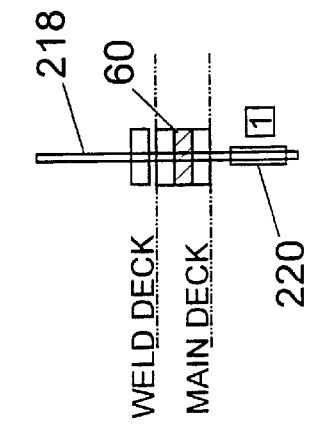
Figure 23B:
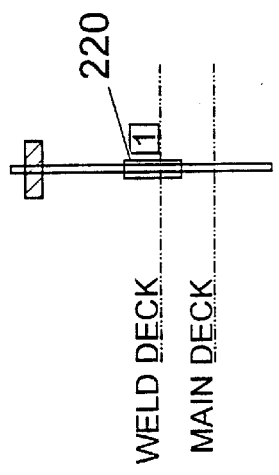
Figure 23C:
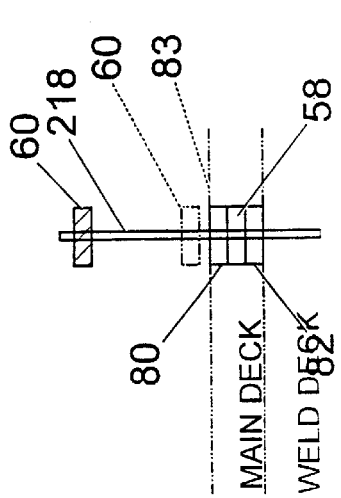
Figure 23F:
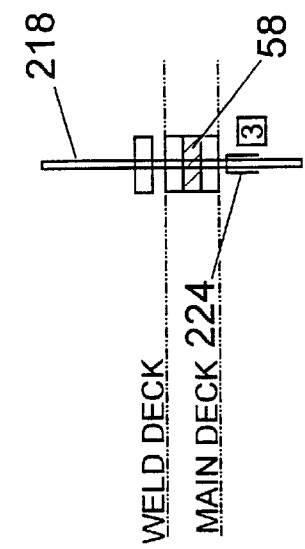
Figure 23E:
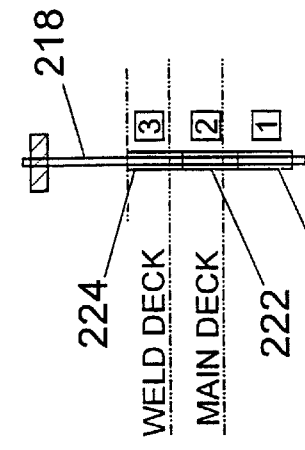
Figure 23D:
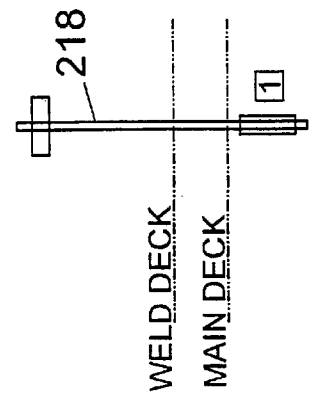
Figure 24A:
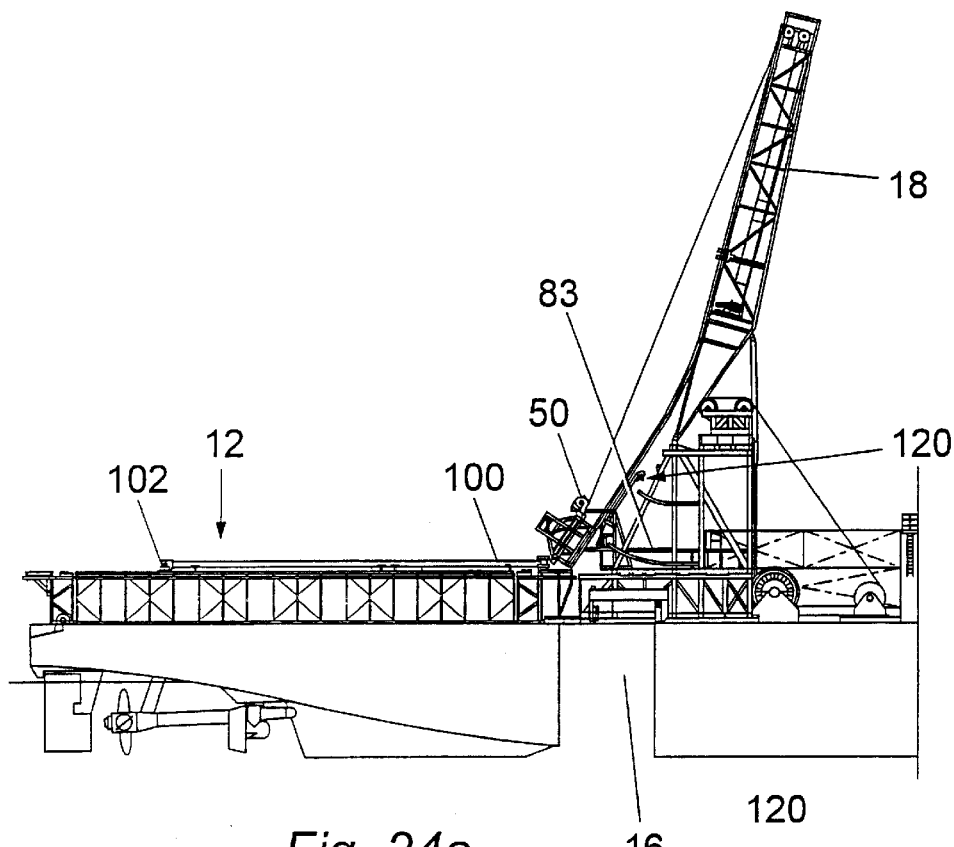
Figure 25:
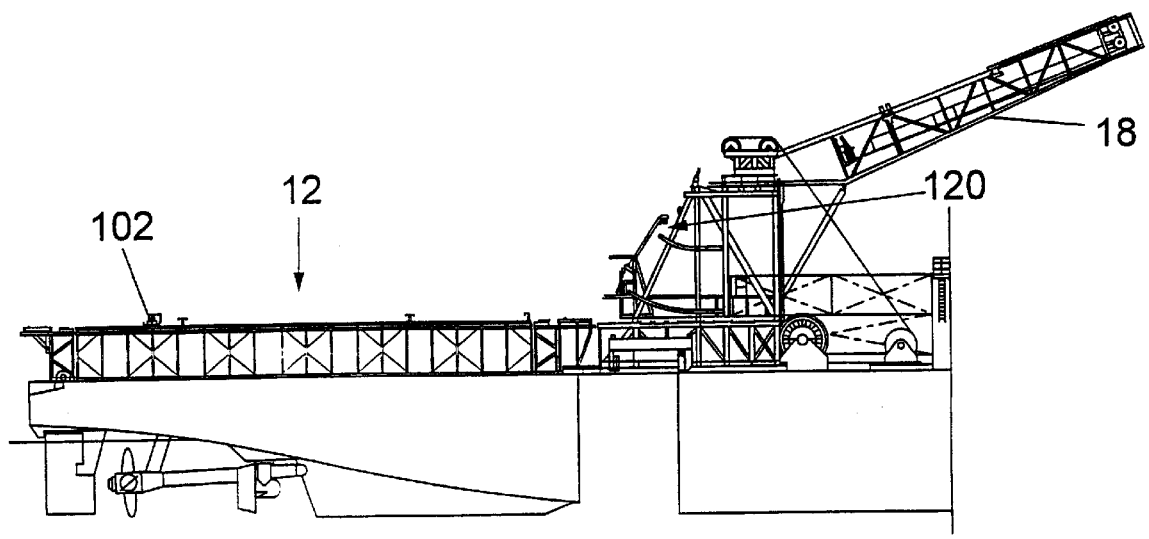
Figure 26:
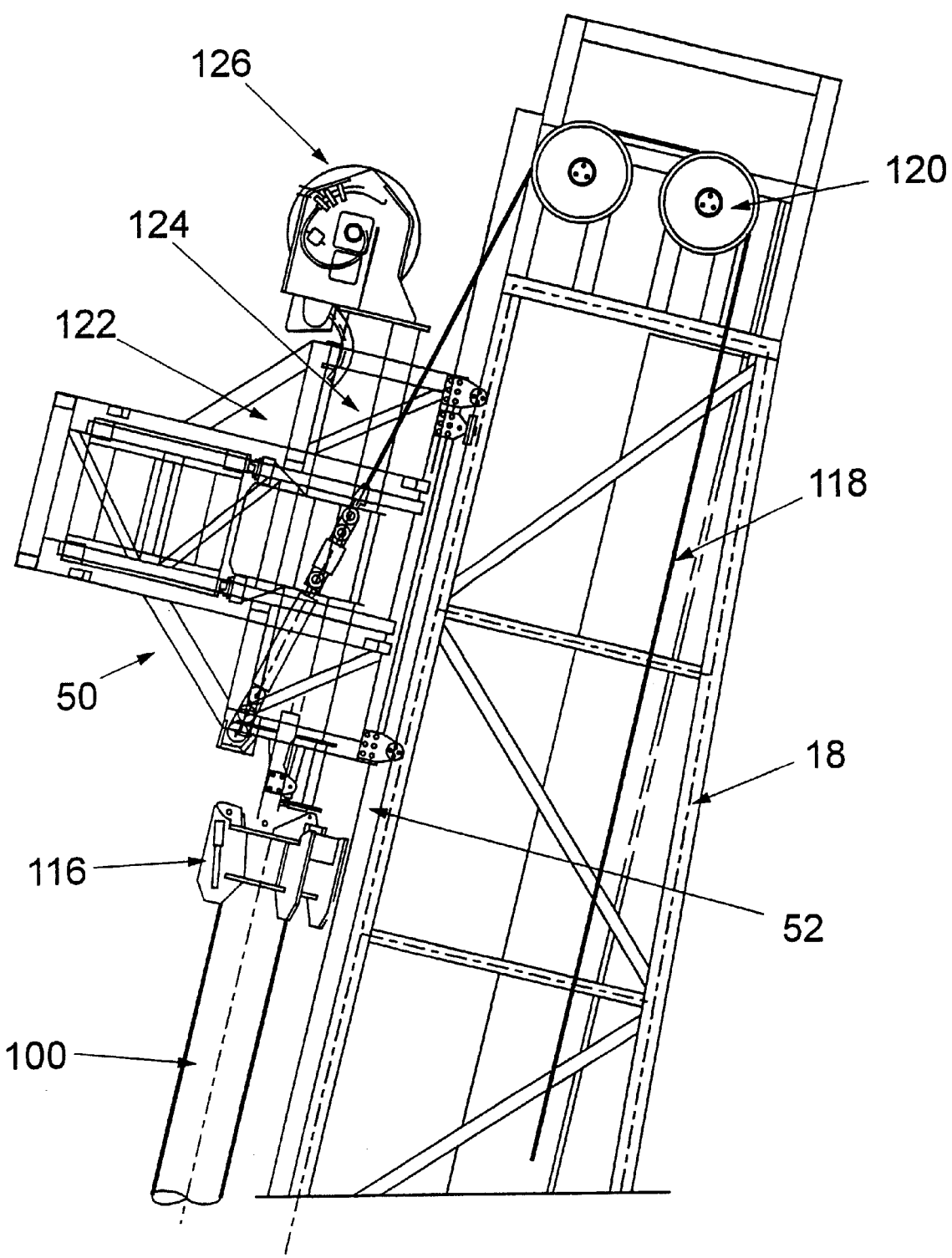
Figure 27:
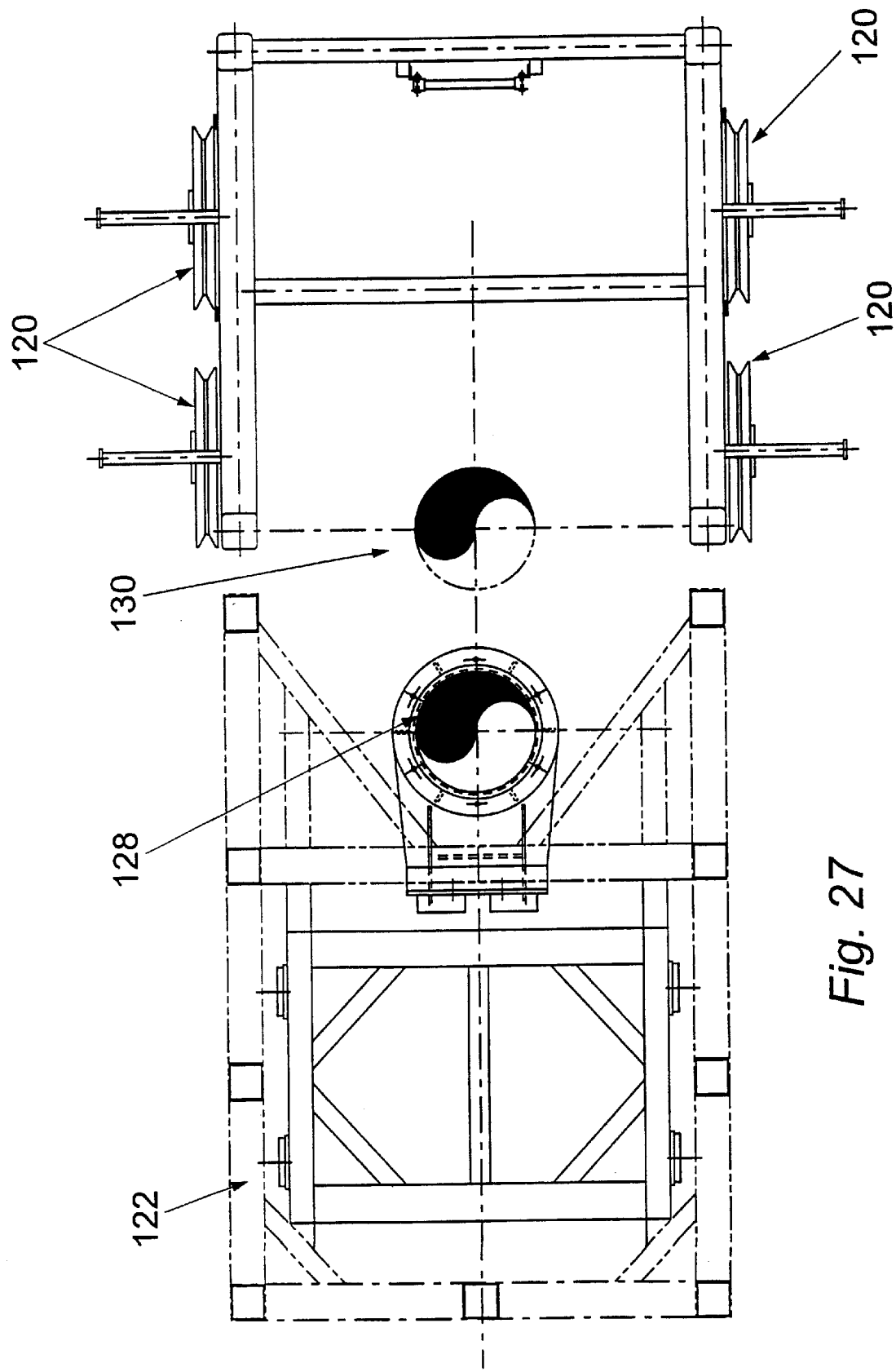
Figure 28B:
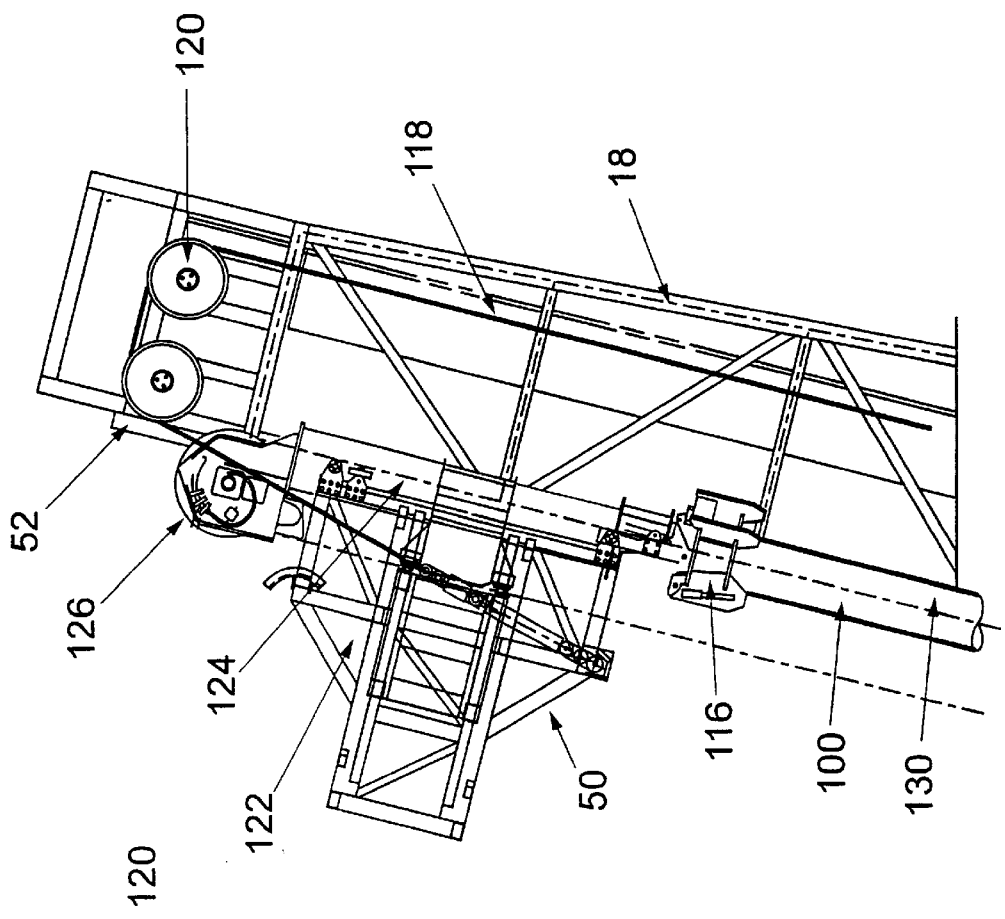
Figure 28A:
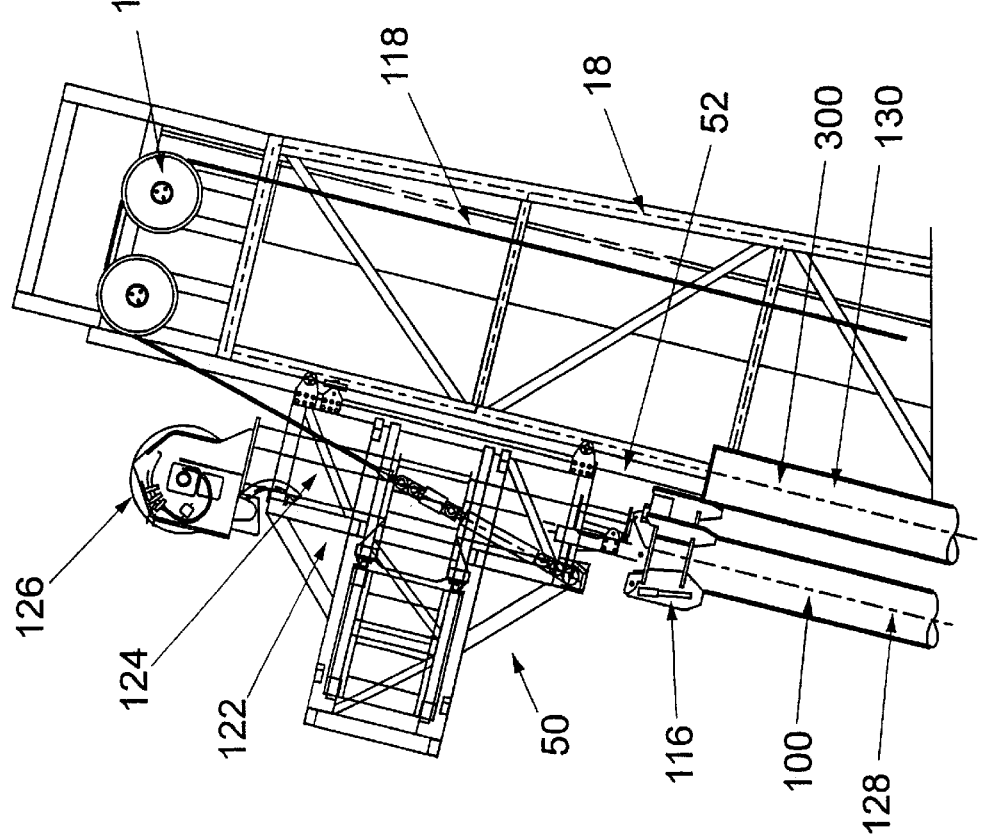
Figure 30B:
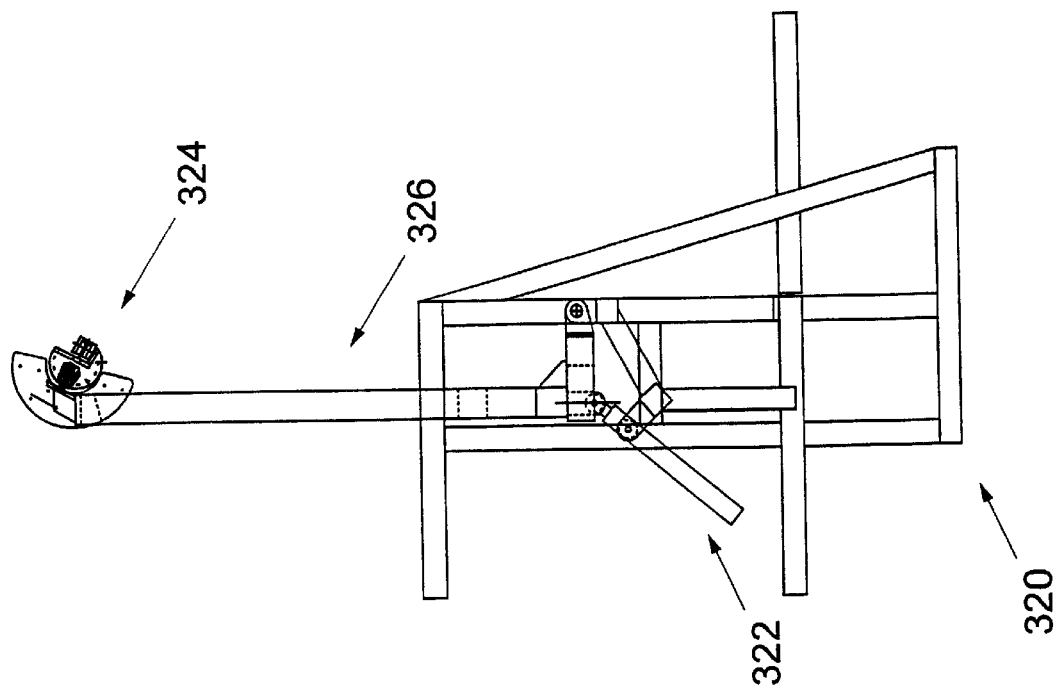
Figure 30A:
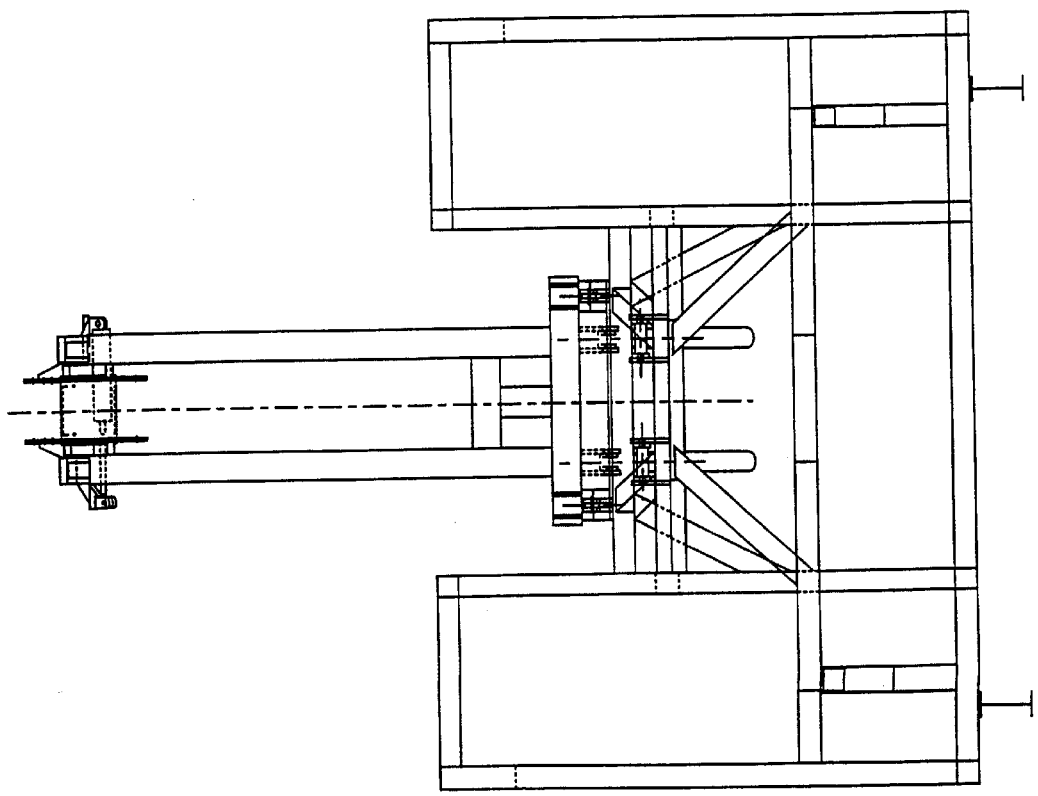
Figure 31A:
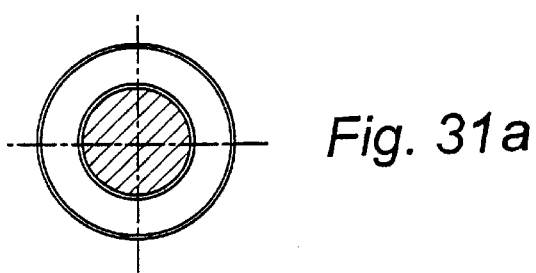
Figure 32C:
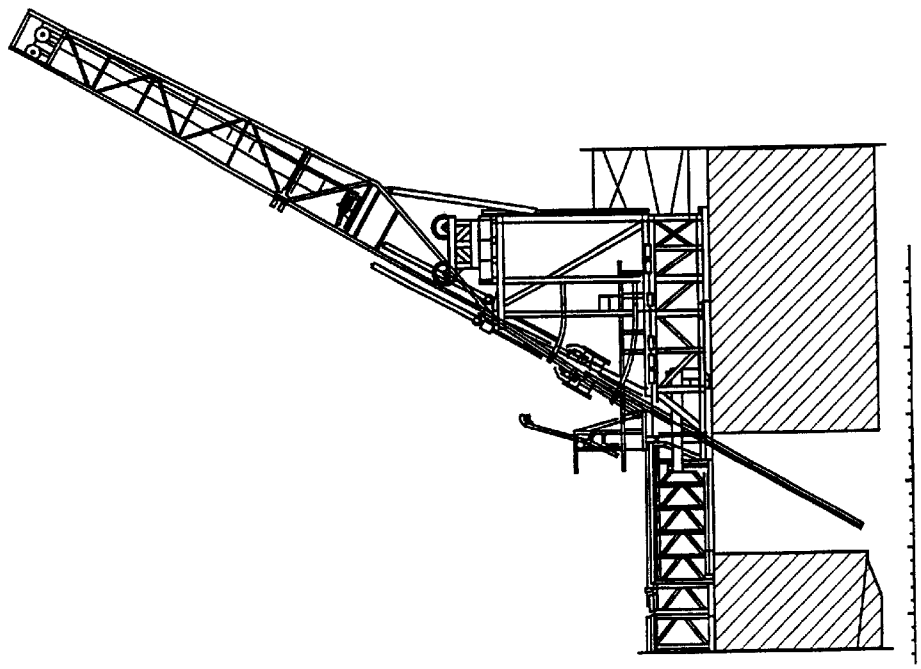
Figure 32B:
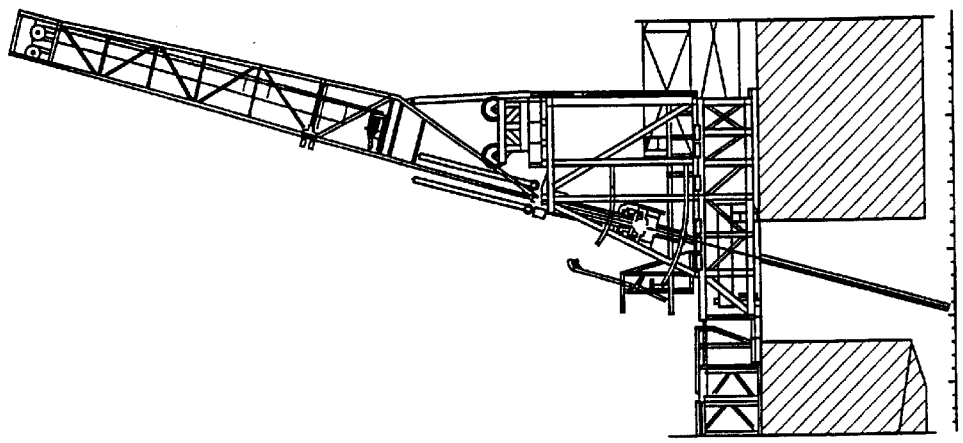
Figure 32A:
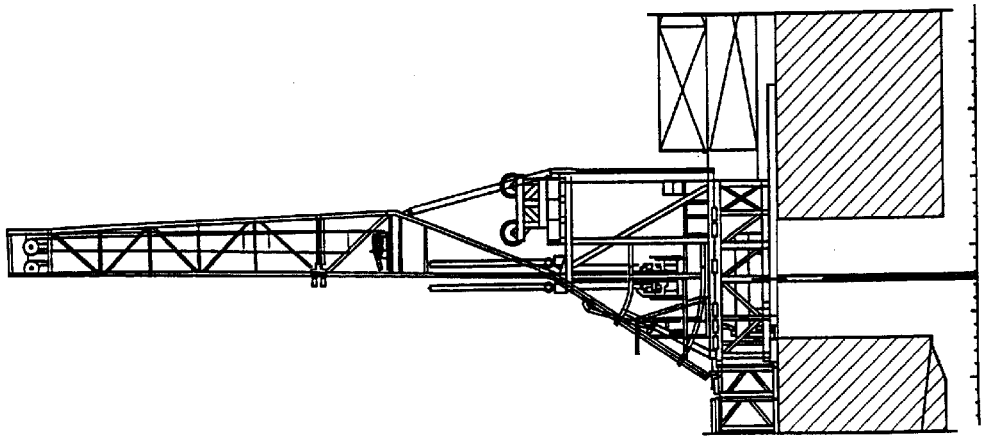

FIGS. 16(a) to 16(e) are various plan views of the clamp assembly of FIGS. 13 to 15, illustrating various components of the assembly in different operating positions;

FIGS. 17(a) and 17(b) are, respectively, partial side (looking aft) and plan views showing an upper guide portion of the clamp assembly of FIGS. 13 to 15 in a retracted position;

FIGS. 18(a) and 18(b) are, respectively, partial side (looking aft) and plan views showing an upper guide portion of the clamp assembly of FIGS. 13 to 15 in a working position;

FIGS. 19(a) to 19(g) are schematic drawings illustrating the operation of the pipelay apparatus in accordance with the invention during a pipelay initiation sequence;

FIGS. 20(a) to 20(i) are schematic drawings illustrating the operation of the pipelay apparatus in accordance with the invention during a basic deployment cycle;

FIGS. 21(a) to 21(h) are schematic drawings illustrating the operation of the pipelay apparatus in accordance with the invention during an abandonment sequence;

FIGS. 22(a) to 22(h) are schematic drawings illustrating the operation of the clamp assembly of FIGS. 13 to 15 during a first operating stroke after completion of a weld between adjacent pipe stalks;

FIGS. 23(a) to 23(l) are schematic drawings illustrating the operation of the pipelay apparatus in accordance with the invention during a sequence for attaching VIV (vibration induced vortex) strakes to the pipeline;

FIGS. 24(a) to 24 (k) are sectional side views of the aft portion of the vessel illustrating the sequence of operations in raising a pipe stalk into position for launching;

FIG. 25 is a sectional side view of the aft portion of the vessel showing the pipe support mast of the vessel lowered into a transit position;

FIG. 26 is a side view of a mast trolley employed in raising the pipe stalk, located at the top of the pipe support mast;

FIG. 27 is a plan view of the trolley of FIG. 26;

FIGS. 28(a) and (b) are side views of the trolley of FIG. 26 showing the operation of the trolley to shift a pipe stalk from a stand-by position into alignment with the lay line along which the pipe will be launched;

FIGS. 29(a) to 29(c) are, respectively, end, plan and side views of a trailing trolley employed in raising the pipe stalk;

FIGS. 30(a) and (b) are, respectively the end and side views of a pipe handling frame device;

FIGS. 31(a) and (b) are, respectively end and side views of an Internal Line-up Clamp; and FIGS. 32(a) to (c) illustrate a range of pipe-lay angles using the apparatus in accordance with the invention.

Referring now to the drawings, there is shown an embodiment of a vessel 10 equipped with a J-Lay pipelaying system, in accordance with the invention. In this example, the pipelay apparatus is installed on an existing dynamically positioned, offshore engineering support vessel. The system is intended to be capable of being installed on a variety of different vessels. Accordingly, the vessel itself will not be described in detail herein.

The pipelay apparatus as seen in FIG. 1 comprises a pipe stalk storage and preparation structure 12 located adjacent and extending forward from the stern of the vessel, a weld station 14 located forward of the pipe stalk preparation structure 12 and above a moon-pool 16, which forms part of the existing vessel 10, and a pipe stalk support mast or tower 18 mounted extending upwardly above the weld station 14. The apparatus thus occupies the main deck area of the vessel, aft of the main superstructure. The tower 18 is mounted on top of a supporting portal frame structure 20, which also encloses the weld station 14. The portal frame structure 20 is in turn mounted on a supporting grillage 22 (FIG. 4), extending fore and aft on either side of the moon-pool 16 and mounted on the main deck 24 of the vessel 10 for fore and aft movement via a skidway (not shown) welded to the deck. The weld station 14 includes a welding deck 83 (FIG. 24(a)), which is spaced above the main deck 24 and above the level of the top of the grillage 22. A further work deck may be located below the welding deck 83 for fitting anodes to the pipeline. This anode deck might typically be located approximately 2 metres below the welding deck.

The mechanism for launching the pipe from the vessel will be described in detail below, but essentially comprises a first, static clamp 58 and a second, mobile or travelling clamp 60 which is movable along the pipe lay line relative to the static clamp 58 by means of an elevator mechanism. The pipe is launched by being gripped alternately by the static and mobile clamps 58, 60. With the pipe gripped by the static clamp and the mobile clamp released, the mobile clamp is raised to its uppermost position. The mobile clamp then grips the pipe, the static clamp is released and the mobile clamp is lowered to its lowermost position, thus paying out a length of pipe equal to the stroke length of the mobile clamp. The static clamp 58 is then re-engaged and the mobile clamp released. This cycle is repeated until the required length of pipe has been launched. The previously launched pipe is supported by the static clamp 58 while new pipe stalks are connected to the upper end of the previously launched pipe.

The static clamp is mounted on a hang-off structure in or immediately above the mouth of the moon-pool 16. The portal frame 20 and grillage 22 together provide a main supporting structure which supports the mobile clamp 60 and its associated elevator mechanism, together with the weld station 14 and tower 18 as mentioned above. Thus, when the full weight of the pipeline is being supported by the mobile clamp 60, the load is carried by this main supporting structure, which is mounted in turn on the main deck of the vessel. That is, the tower 18 is not required to bear the full weight of the pipeline and can therefore be a relatively lightweight structure which is only required to bear the load of one or two pipe stalks.

The mobile clamp 60 is located above the static clamp 58. The uppermost (zero-stroke) position of the mobile clamp is above the level of a welding deck of the welding station 14 and its lowermost (maximum stroke) position is below the level of the welding deck. The welding deck includes doors or hatches which may be opened to allow the passage of the mobile clamp therethrough.

The angle at which the pipe may be launched can be varied by moving the main supporting structure in the fore/aft direction, moving the static clamp hang-off structure in the fore/aft direction, pivoting the mobile clamp 58 and tower 18 about a first horizontal port/starboard axis and pivoting the static clamp 58 about a second horizontal port/starboard axis, so that the clamps 58, 60 and tower 18 may be aligned with the required lay line and the lay line aligned with the moon-pool 16 (FIGS. 32a to 32c).

It is preferred that the main supporting structure is provided by a first structure (grillage 22) mounted on the vessel deck and a second structure (portal frame 20 mounted on top of the first structure. This allows the design of the first structure to be modified to suit different vessels while the same second structure can be used with a variety of different first structures.

In the present example, the pipelay apparatus is configured for pipe stalks comprising two standard pipe joints welded together, having a total length of about 24 metres. In this example, it is intended that the double-joint stalks would be assembled onshore and loaded onto the vessel pre-assembled. It will be understood that the system could be adapted for use with longer stalks, and/or that the welding of the joints making up the stalks could be performed on board the vessel, depending upon the available deck area of the vessel with which the system is to be employed. The present embodiment of the pipelay apparatus is intended to be compact, so as to be usable with a relatively wide range of vessels. The pipelay apparatus is further adapted to be capable of handling single joints of pipe, as well as pre-assembled stalks comprising multiple joints of different lengths.

Figure 2:
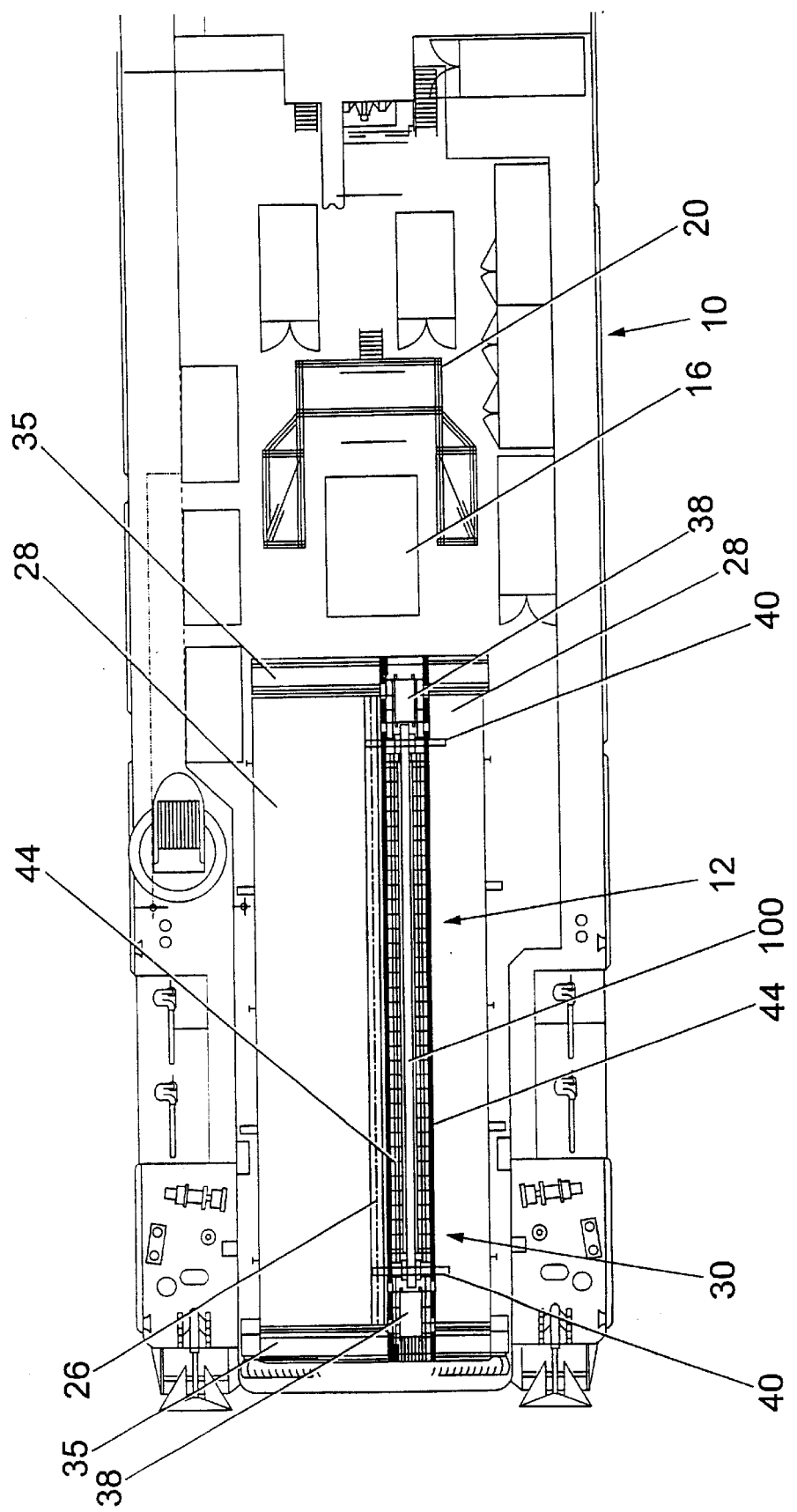
FIG. 2 is a plan view of the aft portion of the vessel of FIG. 1.

Referring to FIGS. 1 and 2, the pipe stalk preparation structure 12 includes a central platform or catwalk 26, extending fore and aft and raised above the main deck of the vessel to a level approximately 1.5 m below the welding deck of the weld station 14. Pipe storage bays 28 are disposed on either side of the platform 26. The structure 12 further includes pipe handling and preparation apparatus 30 for lifting pipe stalks from the storage bays 28 and for bevelling the ends of the pipe stalks in readiness for welding, and for transferring the prepared pipe stalks onto the platform 26.

The apparatus 30 comprises a traversing beam or gantry 32 mounted on bogies 34 which run on transverse rails 35 extending across the width of the structure 12 at its fore and aft ends, enabling the beam 32 to travel sideways across the width of the structure 12. The beam 32 extends fore and aft parallel to the platform 26.

Referring to FIGS. 1, 2, 5, 6 and 7, the beam 32 has pipe preparation decks 36 mounted thereon at either end, supporting pipe bevelling machines 38. Pipe lifting beams 40 equipped with hoists 41 or other suitable lifting gear are also mounted on the preparation decks 36 above the beam 32, enabling pipe stalks to be lifted from the storage bays 28 onto pipe supports 42 located towards either end of the beam 32. The lifting beams 40 are arranged so as to have an overhang reach to both the port and starboard sides of the beam 32, thereby allowing pipe to be lifted from either side of the beam 32. This, together with the traversing motion of the beam 32, enabled by the bogies 34 and rails 35, allows pipe stalks to be retrieved from all parts of the storage bays 28. The hoists 41 mounted on the lifting beam are movable to port and starboard along the lifting beams 40. The beam 32 also supports a walkway 44 extending along the inside thereof and providing access to the full pipe length for inspection and coating repair operations. The pipe supports 42 preferably comprise roller cradles, allowing the pipe to be rotated about its longitudinal axis for inspection etc.

The preparation decks 36, FIGS. 1 and 6, are adapted to move fore and aft along the length of the beam 32 to suit pipe stalks and pipe joints of differing lengths. The bevelling machines 38 are suspended from the lifting beams 40 in such a manner as to allow height adjustment and fore/aft movement in order to engage the ends of a pipe stalk 100 (FIG. 5) mounted on the traversing beam 32.

Control stations (not shown) are provided on each of the preparation decks 36 to allow control of the lifting and bevelling equipment as well as the movement of the traversing beam or gantry 30 and the pipe rollers.

The pipe storage bays 28 (FIGS. 7 and 8), are disposed on either side of the vessel between the central supporting structure for the platform 26 and the vessel bulwarks 46. Bumper frames 48 are provided which are freestanding, deck mounted and constructed of wood. Provision is made for sea-fastening the traversing beam 32, lifting beams 40 and bevelling machines 38 for protection during inclement weather.

In order to transfer a pipe stalk from the storage bays 28 to the platform 26, the traversing beam 32 is moved port/starboard to a position adjacent the pipe stalk which is to be lifted. The preparation decks are moved fore/aft as required to locate the lifting beams 40 above the ends of the pipe and the hoists 41 of the lifting beams 40 are moved port/starboard on the beams to suitable positions above the pipe. Lifting pins mounted on the hoists 41 are inserted in both ends of the pipe and both hoists 41 are operated simultaneously to lift the pipe to a height above the top level of the traversing beam. The hoists 41 are then moved port/starboard on the lifting beams 40 to move the pipe above the pipe supports 42 on the beam 32 (FIG. 1). At this stage any pipe coating may be inspected and repair areas marked ("Holiday Detection"). The pipe is then lowered onto the supports 42, the hoists 41 are disengaged from the pipe by fore/aft movement of the preparation decks and the hoists 41 are traversed clear of the pipe.

Once the pipe 100 (FIG. 2) is located on the supports 42, the bevelling machines 38 are moved fore/aft to engage the pipe ends and operated to produce the required bevels. The pipe may be rotated on the roller cradle supports 42 to enable inspection of the pipe and to facilitate any remedial treatment which may be required.

The pipe is then transferred to the platform 26 using the hoists 41, where the pipe is initially held by support rollers.

The pipelay apparatus further includes means for raising the pipe from the platform onto the tower 18 (FIG. 1), as follows.

A first (trailing) trolley or bogie 102 (FIGS. 29(a)–(c)) is provided which is adapted to run fore and aft on rails 104 extending along the platform 26, driven by a dual winch system (not shown) which drives a drive wire cable. This first trolley 102 is adapted to be connected to the sternmost end of the pipe 100 by means of a tailcap or end clamp 106 which engages and clamps onto a trailing end of the pipe stalk on the platform 26. The tailcap 106 is pivotably connected to the main body 112 for rotation about a horizontal port/starboard axis 114, allowing the pipe to pivot in a vertical fore/aft plane relative to the first trolley 102.

A second (mast) trolley or bogie 50 (FIG. 1) is provided which is adapted to be connected to the forward end of the pipe 100. Three sets of multiple V-section roller supports are provided at the aft, middle and forward end of the platform 26 to provide height adjustment of the forward end of the pipe 100 so as to allow connection of the mast trolley 50. These supports may be lowered out of position when not in use. The mast trolley 50 is stored at a location at the bottom of the trolley rails 52, from where it may be raised and lowered by a cable and winch (hoist) arrangement along rails 52 extending down the mast 18 and aft therefrom to the forward end of the platform 26. The pipe 100 is connected to the mast trolley 50 by means of a headclamp 116 (FIG. 26) which is adapted to engage the outer surface of the pipe and which is also pivotably connected to the mast trolley 50 for rotation about a horizontal port/starboard axis, again allowing the pipe 100 to pivot in a vertical fore/aft plane relative to the mast trolley 50. The mast trolley 50 is illustrated in FIGS. 26 and 27 and will be described in greater detail below.

With the pipe 100 located on the roller supports of the platform 26, the tailcap 106 of the first trolley 102 is clamped to the sternmost end of the pipe or positioned so that pipe is resting in it. The mast trolley 50 is moved from its stored location at the bottom of the trolley rails to the forward end of the platform 26. The headclamp 116 is rotated to the horizontal by means of hydraulic cylinders. The height of the pipe is adjusted using the V-section roller supports and the pipe 100 is moved forward, by operating the first trolley 102, until it engages the headclamp 116 of the mast trolley 50, which is then clamped to the pipe 100, the head clamp having a guidance cone or cage to assist insertion and backstops to locate the pipe connections. The V-section support rollers are lowered as and when required to allow passage of the first trolley 102 and the mast trolley 50 is then pulled up the mast, elevating the pipe into the mast 18. The pivots of the tailcap 106 and headclamp 116 allow the pipe to rotate in said fore/aft vertical plane as it is raised from its initial horizontal position on the platform 26 to its inclined (or vertical) position on the mast 18.

The mast trolley 50 is preferably raised and lowered by means of a hoist arrangement including a hydraulic winch mounted on the mast 18. Most preferably, two winches are employed, providing back-up in the event of failure of one of the winches. The winches suitably have a capacity of 15 tonnes each for a double-joint pipe stalk weighing approximately 10 tonnes. The hoisting wires 118 of these winches extend over sheaves 120 located at the top of the mast 18 and are connected to a main body structure 122 of the mast trolley 50.

The mast 18 defines a "lay-line" along which the pipe is launched from the vessel. The pipe is initially raised into a stand-by position in which it extends substantially parallel to but aft of the lay-line. This enables a first pipe stalk to be in a final laying position on the mast 18 whilst a second pipe stalk is raised into the stand-by position.

When the pipe has been raised into the stand-by position, a pipe handling frame 320 (FIG. 30) is situated at the end of the catwalk track for the purpose of transferring the lower end of the second stalk into the lay line. The assembly is essentially constructed as a pivotal A-frame structure mounted to the pipe handling frame 320. The pivoting structure contains a hydraulic cylinder 322, mounted to the pipe handling frame 320 which is linked to a pivoting pipe arm 326 at the end of which is fitted a hydraulically operated gate 324 which the pipe rests upon during the handling phase. The gate 324 controls longitudinal movement of the pipe and side deflector plates control lateral movement. The first trailing trolley 102 (FIG. 29) can then be disengaged from the pipe and moved aft to its initial position at the sternmost end of the platform 26. The pipe handling frame 320 can then be employed to control the bottom end of the pipe.

Figure 24B:
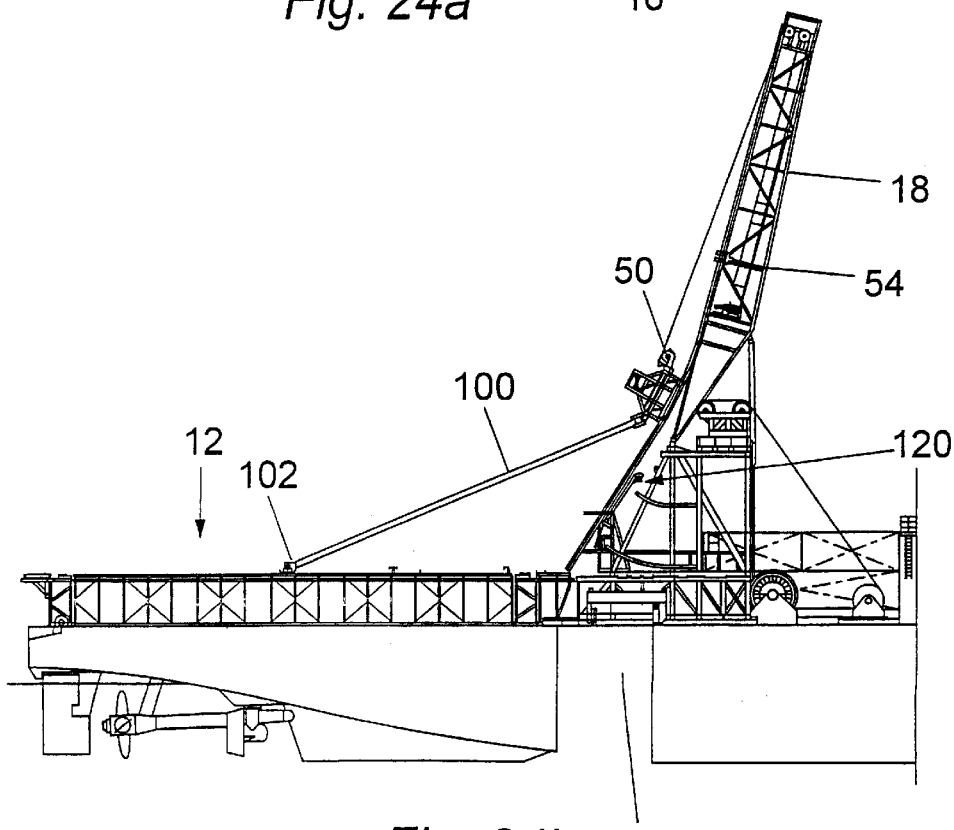
Figure 24C:
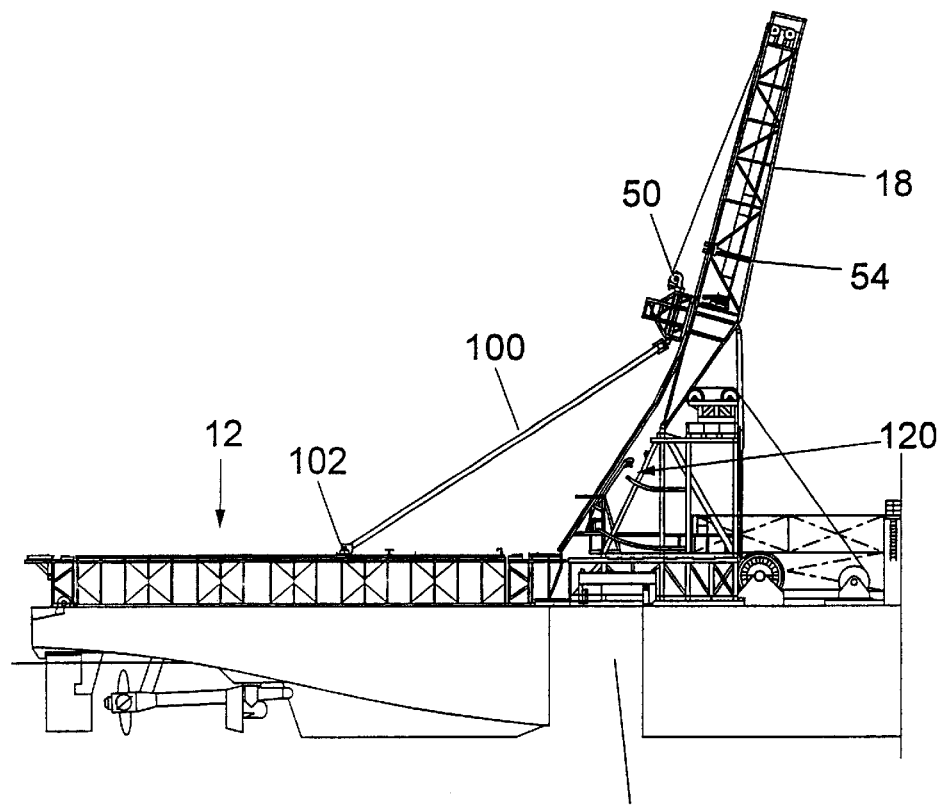
Figure 24D:
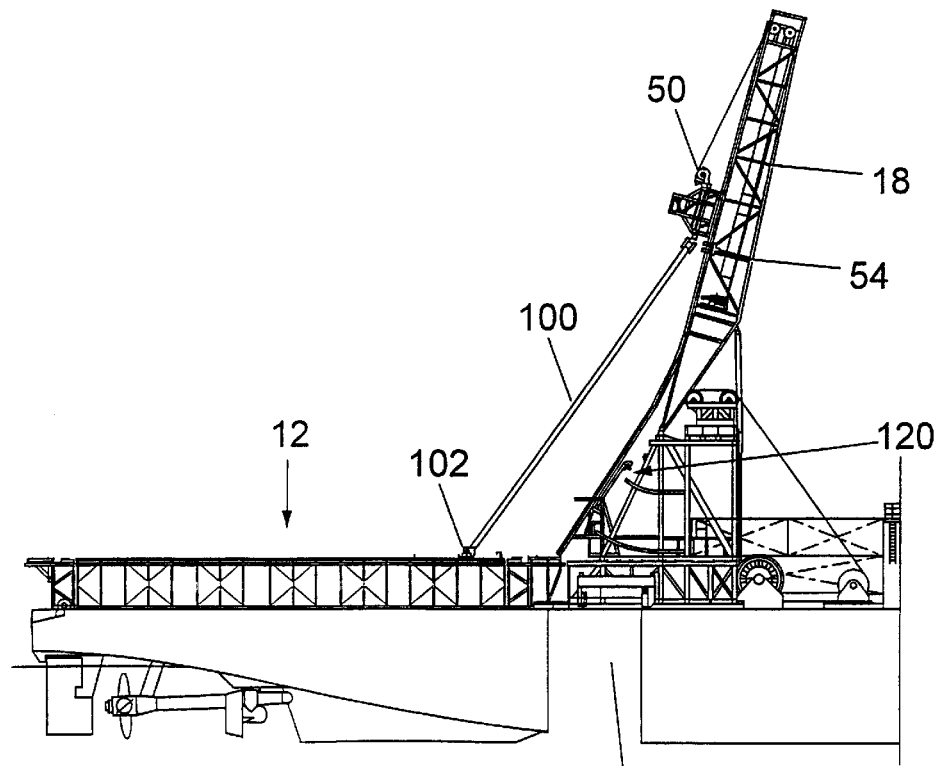
Figure 24E:
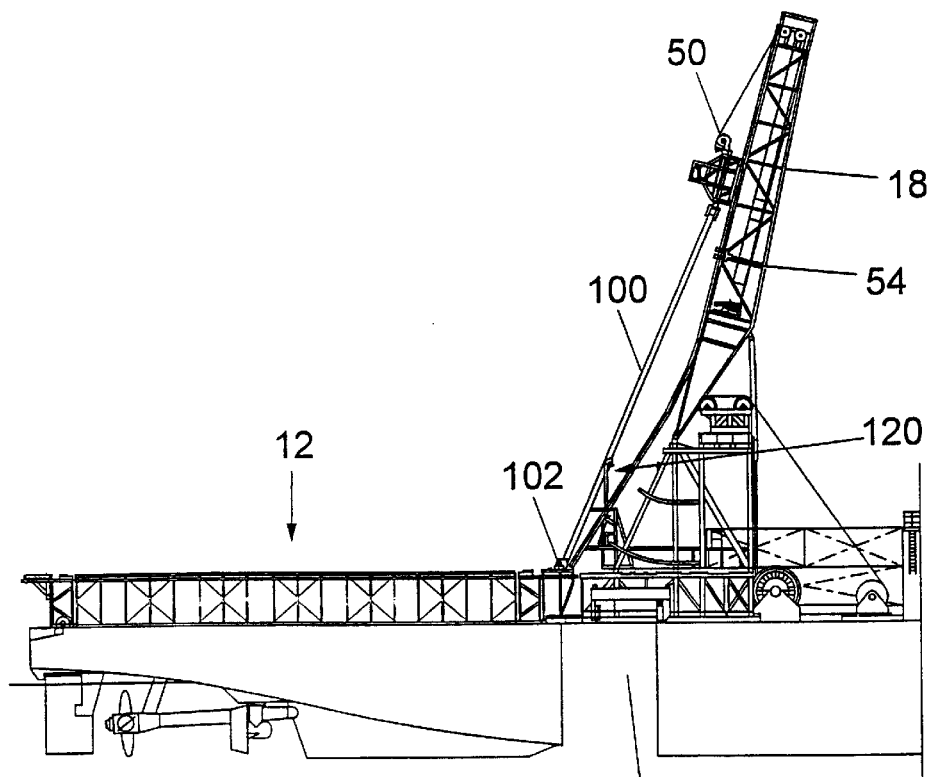
Figure 24F:
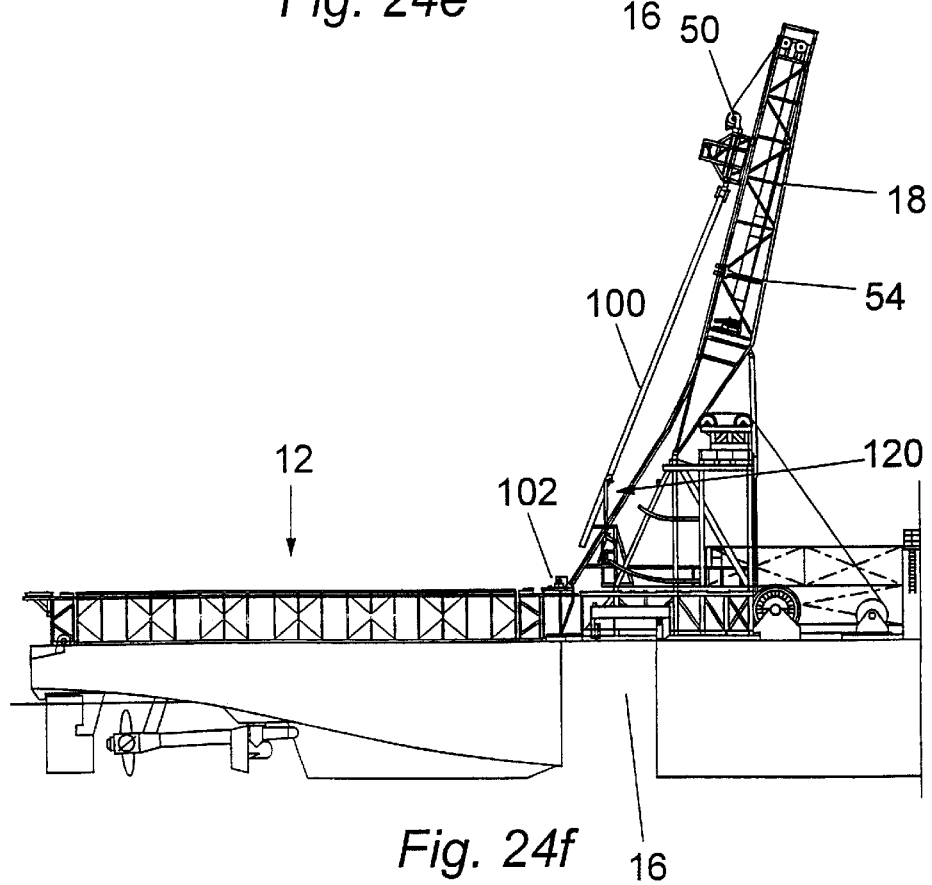
Figure 24G:
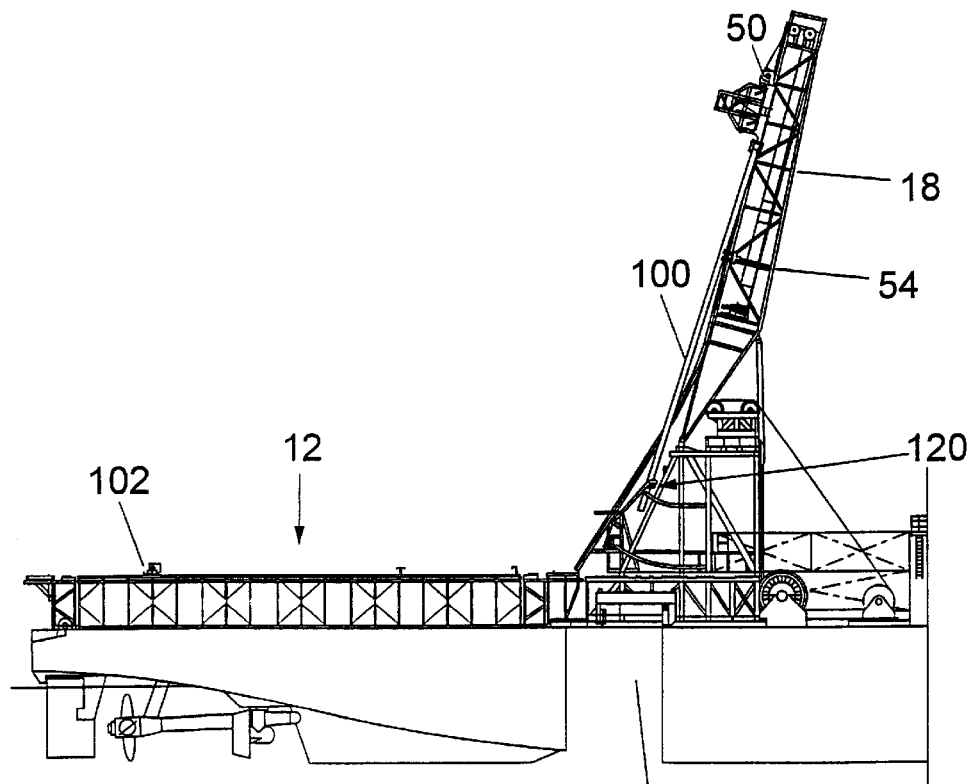
Figure 24H:
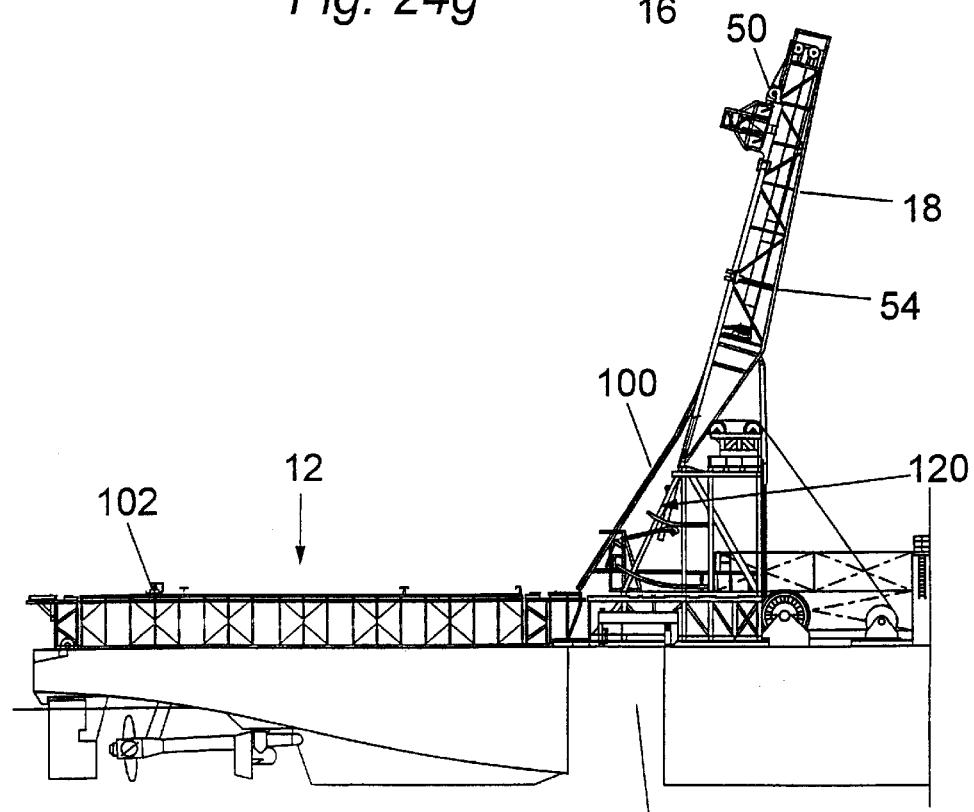

The sequence of operations in transferring the pipe from the traversing beam 32 to the mast 18 is illustrated in FIGS. 24(a)–(k), and is summarised as follows:

the first trolley 102 is moved to its aft position;

the forward V-section support rollers are raised;

the pipe 100 is lifted from the traversing beam 32 onto the platform 26 FIG. 7 and the height of the V-section support rollers is adjusted as necessary;

the first trolley 102 is stroked forward to engage the tailcap 106 on the trailing end of the pipe 100 (FIG. 24(a));

the tailcap 106 FIG. 29(c) is clamped to the pipe 100;

the mast trolley 50 is moved from its stored location to its lowest/sternmost position on the rails 52 (FIG. 24(a));

the headclamp 116 (FIG. 26) is pivoted to match the horizontal orientation of the pipe 100;

the first trolley 102 is stroked forward until the forward end of the pipe 100 engages the headclamp 116 of the mast trolley 50 (FIG. 24(b));

the headclamp 116 is engaged and the V-section roller supports are lowered clear of the pipe 100;

prior to the mast trolley 50 being hoisted up the mast tailcap 102, drive hydraulics are engaged in constant tension causing the tail cap 102 to push the pipe forwards thus ensuring that the pipe cannot hop out of the tailcap;

the mast trolley 50 is raised using the mast winch, the first trolley 102 being pulled along the platform 26 by the action of pulling the pipe 100 (FIGS. 24(b), 24(c) and 24(d));

the pipe 100 is raised until it reaches a point at which the pipe handling frame 320 (FIG. 30), can be rested against the pipe. This position is arranged to coincide with the point at which the first trolley 102 is at the end of its track. In order to connect the pipe 100 to the pipe handling frame, the hydraulically operated gate 324, and arm 226 is rotated aft about a pivot until it touches the pipe surface (approximately vertical position). The mast trolley 50 is then raised approximately a further two metres in order to extract the pipe end from the tailcap 106 (FIG. 24(f)). At this point, the pipe 100 is resting fully on the pipe handling frame with the majority of the weight of the pipe supported by the mast trolley 50, FIG. 24(f). The hydraulically operated gate 324 and arm 326 of the pipe handling frame 320 is then rotated forward FIG. 24(g) so that the pipe 100 is located in its stand-by position. FIG. 24(h) shows further forward movement of the hydraulically operated gate 324 and arm 326 so that the pipe becomes aligned with the lay-line. At this point, the mid mast clamp 54 is moved aft to the pipe, the jaws of the mid mast clamp 54 are then closed to secure the pipe in position.

Figure 24I:
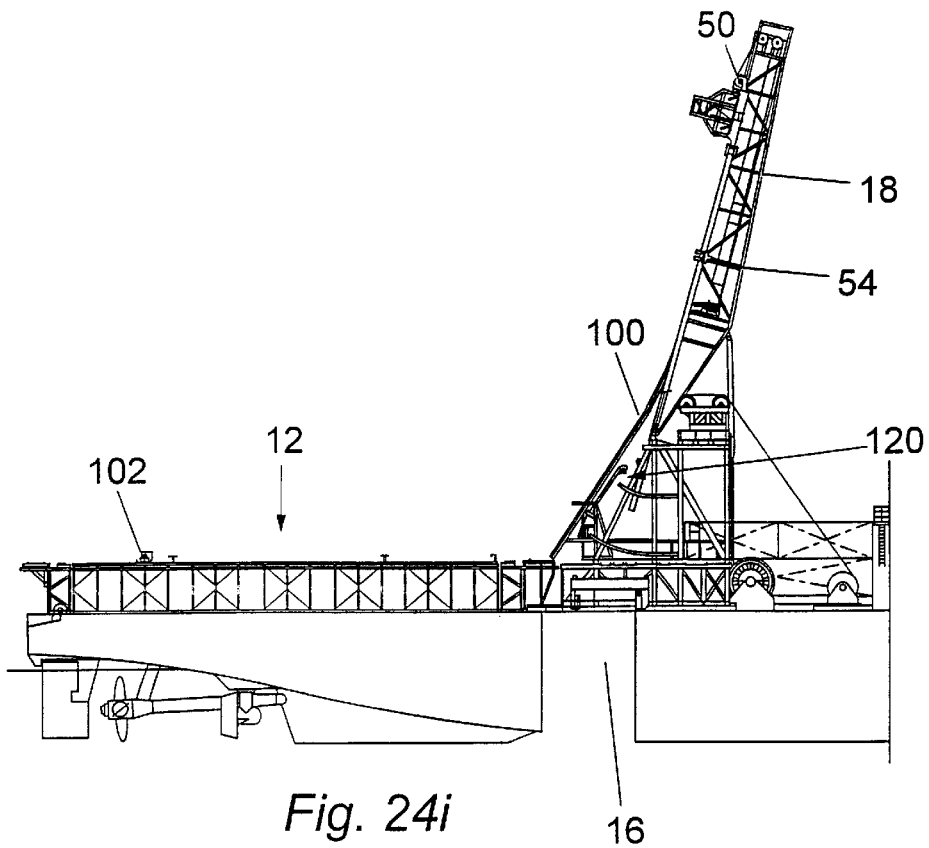

FIG. 24(i) shows the Pipe handling frame returned to its parked position.

Figure 24J:
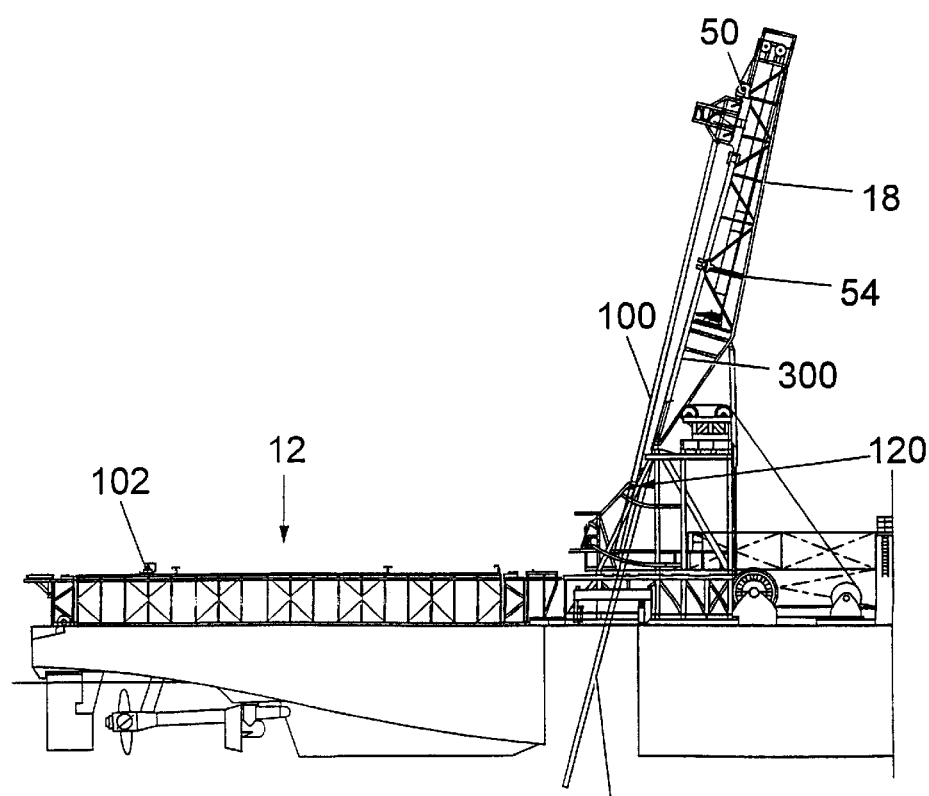

FIG. 24(j) shows the pipe 100 in its stand-by position, waiting for a previously deployed pipe stalk 300, located on the lay line, to be launched after being welded to a further, previously launched pipe stalk 400.

Figure 24K:
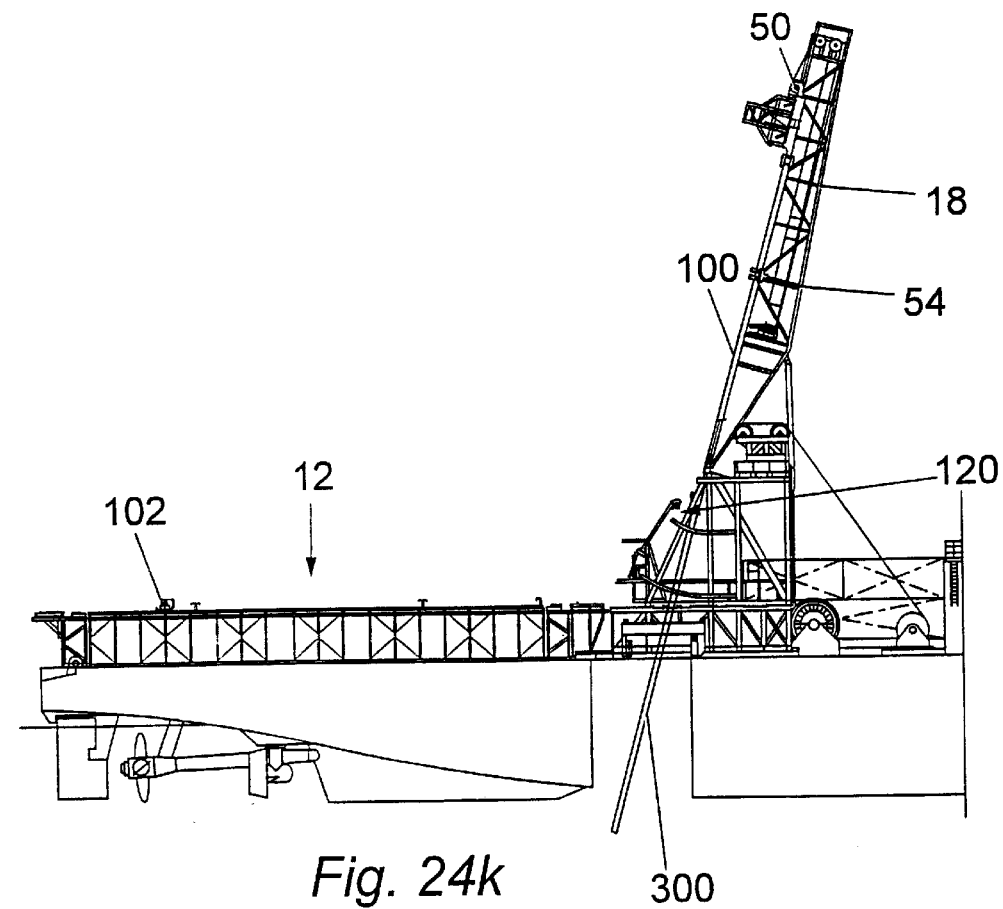

FIG. 24(k) shows the pipe stalk 100 on the lay line following the launch of the preceding pipe stalk 300.

The mast trolley 50 also includes a housing which serves as a garage for an Internal Line-Up Clamp (ILUC) which is used to maintain alignment of the ends of two pipe stalks during welding. The ILUC is deployed from the housing 124 by means of a winch 126 mounted on the housing 124. Once the pipe is in the stand by position, the ILUC is lowered down the interior of the pipe until it is positioned a short distance from the bottom end thereof. The mast trolley 50 is also adapted to enable the pipe to move along its longitudinal axis relative to the trolley, by means of hydraulic cylinders or the like connecting the headclamp 116 and ILUC Garage to the trolley. Further, the headclamp 116 is adapted to be articulated relative to the ILUC, again by hydraulic cylinders, allowing the headclamp and ILUC to be moved relative to the trolley from the stand-by position into the lay line, as seen in FIGS. 28(*a*) and (*b*). FIGS. 27 and 28 also illustrate the stand-by position 128 of the pipe relative to the final launching position 130. FIG. 28(*a*) shows a first pipe stalk 100 in the stand-by position 128, held by the headclamp 116 via the trolley body 122 and the hoist wires 118, with a previously raised pipe stalk 300 in the launching position. In FIG. 28(*b*), the previous stalk 300 has been launched and the hydraulic cylinders of the mast trolley 50 have been operated to shift the pipe stalk 100 into its launching position on the lay line. At the same time the pipe handling frame 320 is articulated to move the lower end of the pipe stalk into the lay line. The alignment position of the pipe 100 with respect to the lay-line is achieved by co-operation of the mast trolley 50 which includes cylinders for fore/aft movement, a mid mast clamp 54 for fore/aft movement and the pipe handling frame which moves the lower end of the pipe into alignment with the lay-line.

Figure 31B:
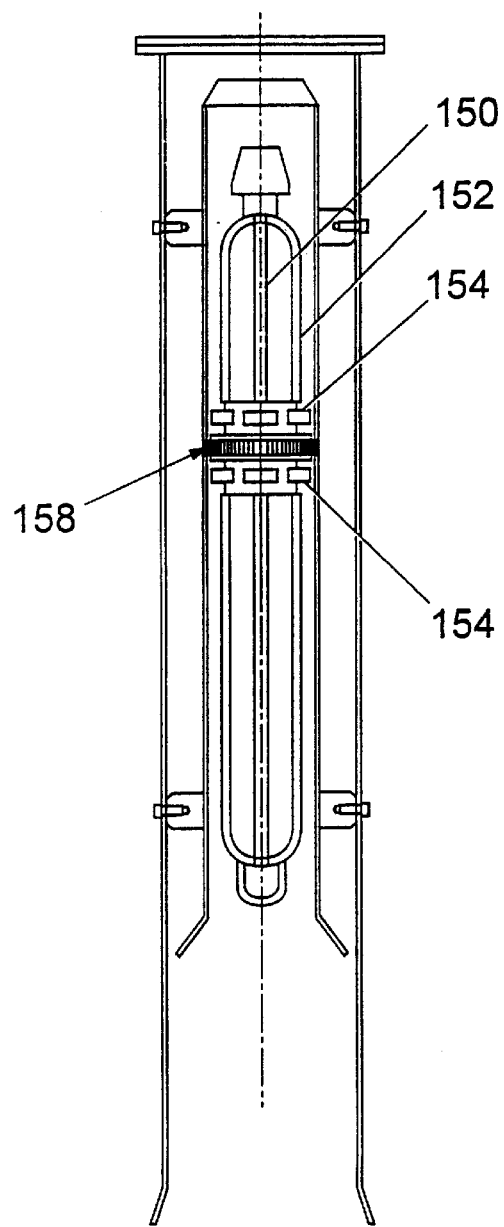

The general function of the ILUC 150 is to maintain final alignment and clamp adjacent ends of first and second pipe stalks during the welding operation. As can be seen in FIG. 31, the ILUC 150 consists of a frame structure 152 dimensioned to fit inside the interior of the pipes and having expanding shoes 154 adapted to clamp against the interior surfaces of the respective pipe ends. Each shoe section is actuated by a pneumatic cylinder and lever mechanism (not shown) which centralises the clamp in the pipe ends to align the end faces of the pipes. The ILUC incorporates an expanding copper backing strip 158 which makes contact with the internal face of the weld joint. The lift wire by means of which the ILUC is deployed from the mast trolley 50 also incorporates an electric control cable for controlling the functions of the ILUC. The ILUC is fitted with an onboard air bottle for powering the clamp actuating cylinders, which requires periodic refilling. When not in use, the ILUC is stored in a garage tube mounted within the mast trolley 50.

The pipe launching apparatus for lowering pipe from the tower 18 and its operation will be described in detail below. Briefly, pipe is raised onto the mast, its lower end is welded to the upper end of a previously launched pipe stalk, the newly attached stalk is lowered, and this cycle is repeated as pipelaying progresses. For the purposes of the present discussion, it will be assumed that a first pipe stalk is positioned on the lay line of the mast 18 with its lowermost end welded to the previous stalk, ready to be lowered, and a further stalk has been raised into the stand-by position parallel with the first stalk.

The pipe launching apparatus is operated to lower the first stalk along the lay line until its upper end projects a short distance (typically about 1.5 m) above the weld deck of the welding station 14. The second stalk is then moved from its stand-by position into the lay line by means of the pipe handling frame device 320 and by operation of the hydraulic cylinders of the mast trolley 50 which articulates the ILUC garage and head clamp assembly of the mast trolley 50 into the lay line. At this stage the second pipe stalk is engaged by the mid-mast clamp 54 mounted on the mast 18. The mid-mast clamp secures the pipe stalk in the lay line against lateral movement, but does not apply any longitudinal clamping force to the pipe. With the second stalk held in a controlled manner by the mast trolley and mid mast clamp, the pipe handling frame gate is swung open (forward) by hydraulic action freeing the lower end of the second stalk. When fully open the pipe handling frame can then return to the stand-by position and subsequently re-close the gate. The moving clamp 60 (and elevator beam 65, described in detail below) is raised to its highest position (zero stroke) which allows four line up rollers, mounted to the underside of the elevator beam to engage the pipe to provide fine adjustment. The lowermost end of the second stalk is axially aligned with the upper end of the first stalk, in a manner to be described in greater detail below, with a small gap between the adjacent ends. The ILUC is then lowered through the interior of the first stalk until it bridges the ends of the pipe stalks and is adjusted so that its copper backing strip is aligned with the weld location. The lower half of the pipe is locked first and final alignment/adjustment is made. The upper half is then locked and the vertical stroke is actuated for adjustment to the required gap size. Welding can then proceed.

Once the weld is at least partially complete (first hot pass), the ILUC can be disengaged and returned to the housing 124 in the mast trolley 50, the headclamp 116 can be disengaged from the upper end of the second pipe stalk and the mast trolley 50 can then be deployed to begin raising the next pipe stalk into the stand-by position.

Before describing the pipe launching apparatus in detail, further features of the tower or mast 18 will be described. The tower 18 is mounted on top of the portal frame structure 20 above the weld station 14, and comprises a derrick type structure defining a pipe-launching path (lay line) which extends through the weld station 14 and moon-pool 16. It is advantageous for the pipe launch path to be vertical or near-vertical, in order to minimise the tension which must be applied to the pipeline so as to avoid buckling of the pipeline during laying operations. The optimal launch angle for any given operation will be determined by the parameters of the pipeline, water depth etc. In the present example, the pipe launch angle is adjustable through a range of about 60° to 90° relative to the horizontal. This range of adjustment is enabled by the mast 18 being pivotable about a horizontal port/starboard axis, as can be seen in FIGS. 31(*a*), 32(*b*) and 32(*c*), at the aft edge of its base, the angle being controlled by hydraulic jacks 56 and a jacking strut incorporated into the forward side of its base as seen in FIG. 1.

The winch for raising and lowering the mast trolley 50 is mounted on the tower 18, and cooperates with the sheaves 120 (FIG. 26) at the top of the tower 18 for pulling pipe stalks up from the preparation structure 12 into position on the tower 18 as previously described. It is preferred that the tower 18 can be lowered from its working position when the vessel is in transit between pipelaying operations, as illustrated in FIG. 25.

The pipe launching apparatus will now be described in detail.

The pipe launching apparatus includes a first, static clamp assembly 58 (FIG. 1), located over the moon-pool 16 substantially at the level of the main deck of the vessel 10 and a second, mobile or travelling clamp assembly 60 FIG. 4, (also referred to herein as the "lowering clamp"), which is disposed above the first clamp 58. The second clamp assembly 60 is situated upon a beam which in turn is coupled to first, lowermost, working ends of an array of hydraulic jacks or rams 62 extending above the second clamp assembly 60. The jacks 62 and mobile clamp assembly 60 are mounted in a supporting frame, which in turn is pivotably mounted in the portal frame structure 20, such that the jacks 62 may be operated to effect reciprocating movement of the second clamp assembly 60 along the lay line. The pivotable mounting of the supporting frame enables the mobile clamp to be aligned with the lay line, as described below.

In order to align the clamps 58 and 60 with the lay line, the supporting frame mounting the second clamp assembly 64 and its associated jacks 62 can pivot around the pivot axis of the mast 18, within the mouth of the portal frame structure 20, whilst the first clamp assembly 58 can be pivoted about a horizontal port/starboard axis and can also be skidded in the fore/aft direction. In addition, the entire portal frame structure 20, together with the weld station 14, grillage 22 and tower 18, can also be skidded in the fore/aft direction on top of skidways mounted to the deck. FIG. 2 shows the portal frame 20 in a relatively forward position, whilst FIG. 5 shows the portal frame 20 in a relatively aft position. Besides aligning the clamp assemblies 58 and 60 with the lay line, these movements align the lay line relative to the moon-pool 16 (FIG. 1) and also allow the pipe launching apparatus to be moved out of the way as required for certain aspects of pipelay operations, as shall be described further below.

The location of the static clamp 58 below and relatively close to the welding station 14 is advantageous since, besides acting as a primary pipe retaining clamp, it also serves the purpose of clamping the previously launched pipe for the purposes of connecting the next pipe stalk, thereby obviating the need for an additional welding clamp on the downstream side of the weld station. The location of the mobile clamp above the static clamp is also advantageous in reducing the overall size and complexity of the apparatus.

Figure 10:
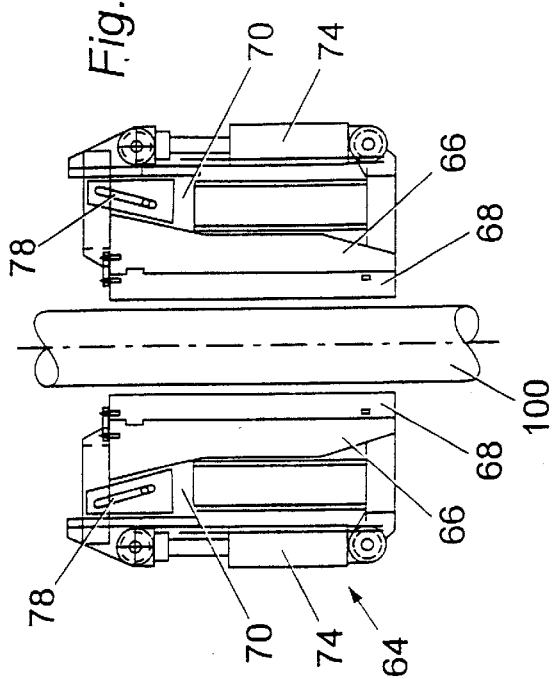
FIG. 10 is a sectional view on line 10—10 of FIG. 9.
Figure 9:
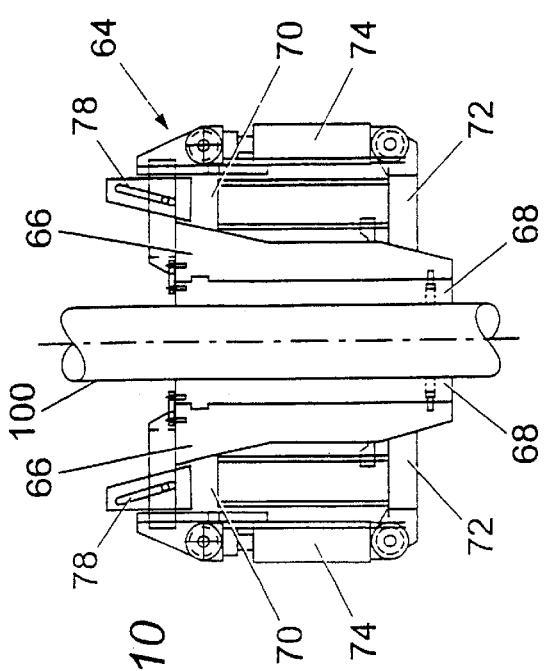
FIG. 9 is a plan view of one example of a pipeline clamp for use in the present invention, illustrated in a closed, pipe-engaging position.
Figure 12:
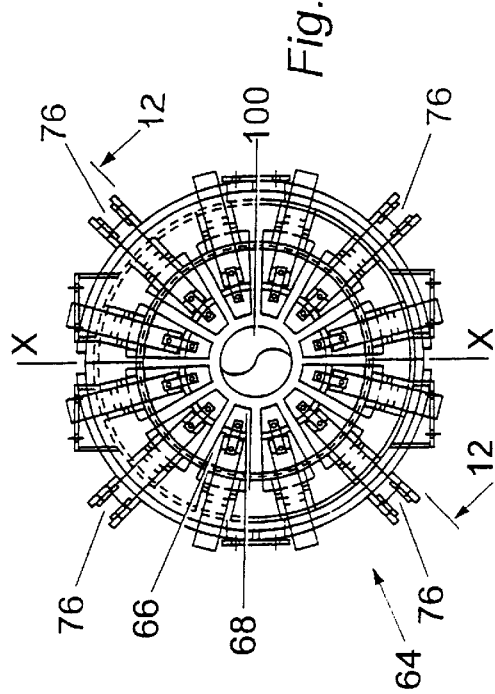
FIG. 12 is a sectional view on line 12—12 of FIG. 11.
Figure 11:
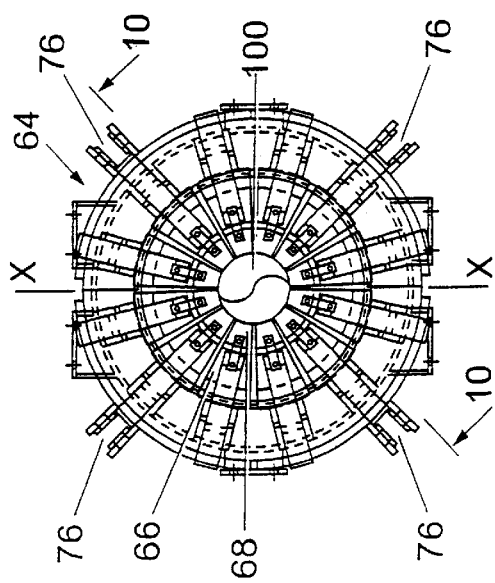
FIG. 11 is a further plan view of the clamp of FIG. 9, illustrated in an open position, with its clamping elements retracted so as to be disengaged from the pipe.

Before describing the clamp assemblies 58 and 60, reference is made to FIGS. 9 to 12, which illustrate a preferred form of pipe clamp 64 which is suitable for use in both the static and mobile clamp assemblies 58 and 60. FIGS. 9 and 10 show the clamp closed to engage pipe 100, and FIGS. 11 and 12 show the clamp open.

The clamp 64 comprises two semi-cylindrical halves, which split along the axis X—X in FIGS. 9 and 11. A plurality of wedge portions 66 (twelve in this example, six on each half of the clamp) surround the pipe 100. Each of the wedges 66 has an insert portion 68 attached to its innermost face. The inserts 68 engage the pipe surface when the clamp is closed. The inserts 68 are removable and may be replaced by different inserts to suit different sizes of pipe. The inserts can be provided with a coating of Neoprene or the like which gives enhanced friction properties and minimises pipe coating damage.

The outer surfaces of the wedges 66 include tapered portions which cooperate with corresponding tapered portions 70 and 72 on the body of the clamp. The wedges 66 are raised and lowered relative to the body of the clamp by means of hydraulic cylinders 74 coupled to the clamp body (four cylinders in this example, two on each clamp half) at locations 76 around the circumference of the clamp 64. When the wedges are lowered as seen in FIG. 10, they are forced inwards by the cooperating tapered surfaces so that the inserts 68 engage the pipe 100. When the wedges are raised, as seen in FIG. 12, they are urged outwards by slot-and-slide couplings 78, thereby disengaging the inserts 68 from the pipe 100. When the clamp is engaged, downward force on the pipe tends to increase the clamping effect, by virtue of friction between the pipe 100 and the inserts 68. Accordingly, tension applied to the pipe during pipelaying operations enhances the operation of the clamp, the clamping force being directly related to the pipe tension so that the clamping action is effectively self-actuating. The clamps are load rated so as to be capable of independently supporting the weight of a full pipe catenary (a suitable load rating being, for example, of the order of 240 tonnes).

FIGS. 13 to 17 illustrate the static clamp assembly 58, which comprises a clamp 64 as shown in FIGS. 9 to 12, an upper pipe guide 80 and a lower pipe guide 82, located below the weld deck 83 (FIG. 24(a)). These components are mounted on a hang-off structure 84 located over the moon-pool 16 and adapted for fore/aft movement relative to the moon-pool 16. As previously described, the clamp 64 and guides 80 and 82 are pivotably mounted in the hang-off structure 84 for rotation about a horizontal port/starboard axis 86 (FIG. 15). The clamp 64 is split along the fore/aft direction, as are the upper and lower pipe guides 80 and 82. When split, the clamp and guides can be fully retracted clear of the lay line, as illustrated on the right hand side of FIGS. 13, the left hand side of FIG. 14 and in FIGS. 16(a) and 16(b). The left hand side of the same drawings show the clamp and guides in their working positions. The guides 80 and 82 can also be partially retracted from their working positions to a "working retracted" position to provide limited clearance around the pipe as seen in FIGS. 16(d) and 17(a) and (b).

The mobile clamp assembly 60 FIGS. 12 and 19 comprises a clamp 64 mounted on an elevator beam structure 65 which is raised and lowered by means of the jacks 62. These are mounted within a supporting frame 67 (FIG. 19) as previously mentioned, which in turn is pivotably mounted in the portal frame structure 20. The clamp 64 is further provided with a lower guide including hydraulic actuators for adjusting the alignment of the pipe in a plane at right angles to its longitudinal axis. The guides of the mobile clamp assembly can also be split and fully retracted, or partially retracted to a "working retracted" position 17(b).

The guides of the static and mobile clamp assemblies do not normally contact the pipe when the clamp is actuated. The guides contact the pipe only to ensure that the guide remains essentially central in the clamp. This prevents the pipe rubbing against the wedge inserts of the clamp. Line-up rollers on the underside of the elevator beam perform a similar function to maintain the pipe centrally in the moving clamp when it is not clamped.

The basic operation of the clamp assemblies 58 and 60 for launching a pipe consists of the pipe being gripped alternately by the static and mobile clamps 58 and 60. While the pipe is gripped by the static clamp 58, the mobile clamp 60 is released and raised to its uppermost position by the jacks 62. The mobile clamp 60 then engages the pipe, the static clamp 58 is released and the mobile clamp 60 is lowered to its lowermost position, paying out a length of pipe equal to the stroke length of the jacks 62. The static clamp 58 is re-engaged and the mobile clamp 60 released and raised once again. This sequence is repeated until the upper end of the pipe stalk is close to the weld deck, ready for the next pipe stalk to be connected thereto. This sequence will be described in greater detail below. In addition, the elevator beam moves slightly to compensate for wedge insert movement when clamping to ensure zero relative movement between pipe and wedge insert.

The pipelay apparatus further includes abandonment and recovery (A&R) gear, for use in abandoning the end of a completed (or partially completed) pipeline and for recovering the end of a pipeline for continuing a partially completed pipelay operation or for repairing or removing the pipeline. A&R gear and its methods of use are generally well known in the art. In the present case, an A&R winch is preferably mounted on the main deck of the vessel forward of the portal frame structure 20. A&R sheaves are preferably mounted on the top of the portal frame structure 20 or on the mast 18, allowing an A&R wire to be reeved via the sheaves to extend downwards through the moon-pool 16. The sheaves may be arranged so as to minimise horizontal force components applied to the portal frame or mast when the A&R winch is operated to tension the A&R wire.

The welding procedure will now be described in detail.

A first previously deployed pipe stalk is held by the static clamp 58 with its upper end projecting above the weld deck 83, FIG. 21. The mobile clamp 60 is lowered to its lowest position, allowing the next pipe stalk to be loaded into the lay line in the manner previously described. The pipe handling frame 320 centres the pipe in the clamp. The bottom end of the new pipe stalk is positioned in line with the existing pipe and the midmast clamp is actuated until it touches the pipe and the jaws are closed to eliminate lateral movement. The mobile clamp 60 is then raised to engage the lower end of the new pipe via the line-up rollers. If additional pipe alignment is required, the hydraulically actuated pipe guide on the bottom of the mobile clamp assembly can be operated to adjust the pipe in the X-Y plane at right angles to the longitudinal axis of the pipe (Z-axis). Z-axis adjustment can be effected via vertical stroking hydraulic cylinders mounted externally to the mast trolley 50 as previously described. Using these cylinders, the bottom end of the new pipe stalk can be lowered to within 100 mm of the upper end of the existing pipe. The ILUC is then lowered into position as previously described, the new pipe 216 lowered into abutment, appropriate for the specific weld, with the existing pipe 212 and the ILUC engaged to lock the pipes together.

The nature of the present pipelay system is such that all welding, pre-heat, non-destructive testing (NDT) and field joint coating (FJC) operations must be performed at a single station. For this reason an automated welding process is preferred. To prepare for welding, pre-heat coils are applied to the pipe ends. The weld is preferably performed using a pulsed gas metal arc welding process in a number of passes (root, hot, fill and capping passes). The copper backing shoes of the ILUC allow for increased root pass welding speeds and improved root bead profile. The welding is performed by welding "bugs" which travel around the pipe on a pre-placed guide band, and which are pre-programmed with wire feed speed, travel speed, voltage and current parameters, etc.

On completion of the weld, water cooling is applied to the pipe to allow NDT inspection and then a field joint coating to be applied.

On completion of the root weld or one of the subsequent welding passes, the ILUC can be unclamped and withdrawn to its housing 124 (FIG. 26) and the headclamp 116 disengaged, allowing the mast trolley 50 to be re-deployed to raise the next pipe stalk into its stand-by position.

Anodes and strakes may also be fitted to the pipes at this stage by any suitable means at an additional deck below the weld deck.

The operation of the pipe launching apparatus will now be described in detail.

FIGS. 19(*a*) to (*g*) show the sequence of operations for initiating a pipelaying operation, as follows:
(a) Initially, the mobile clamp 60 is located at its minimum elevation. The mobile clamp 60 is open and the static clamp 58 is split and fully withdrawn. The lower guide of the mobile clamp is open.
(b) An initiation wire 200 is recovered into the moon-pool 16 and made fast to the vessel (the use of an initiation wire for initiating pipelay operations is well known in the art and will not be described further herein).
(c) A first pipe stalk 204 with initiation head already welded into it is hoisted into the lay line and lowered until its lower end is approximately 100 mm above the mobile clamp 60. The mid mast clamp 54 is positioned and the jaws closed to hold the pipe.
(d) The mobile clamp 60 is raised to its maximum elevation (zero stroke).
(e) The mobile clamp 60 is actuated to engage the pipe 204. The weight of the pipe is transferred to the mobile clamp.
(f) The mobile clamp 60 is lowered to a suitable elevation to enable the initiation wire 200 to be attached to the pulling head 202. When attached the mobile clamp 60 is lowered to its minimum elevation (maximum stroke).
(g) The static clamp 58 is closed and actuated to engage the pipe 204.

The clamps are then operated in the manner described below to lower the pipe stalk 204 until its upper end is positioned above the weld deck 83 ready for the next pipe stalk to be welded thereto.

FIGS. 20(*a*) to (*i*) illustrate the basic deployment cycle for clean pipe.
(a) Initially, the mobile clamp 60 is at its maximum elevation (zero stroke). The mobile clamp 60 is locked and the static clamp 58 is open, so that the pipe is held by the mobile clamp 60. The lower guide of the mobile clamp is in a stand-by position and upper and lower guides 80 and 82 are engaged (in their working positions) (FIG. 22).
(b) The mobile clamp 60 is deployed to a position slightly above its lowest position (maximum stroke).
(c) The static clamp 58 is engaged and at the same time the elevation of the elevator beam is adjusted (downwards) so as to minimise relative movement between the wedge inserts and the pipe.
(d) Hydraulic pressure to the mobile clamp 60 is reversed and the mobile clamp is deployed to maximum stroke so that the clamp is disengaged from the pipe and the load is transferred to the static clamp 58. At this stage, tension readings from sensors on the clamps 58 and 60 are cross checked to ensure 100% transfer of load from the mobile clamp 60 to the static clamp 58; i.e. to ensure that the static clamp 58 is properly locked.
(e) The wedges of the mobile clamp 60 are released and the clamp is opened to its working clearance.
(f) The mobile clamp 60 is raised to a position close to zero stroke.
(g) The wedges of the mobile clamp 60 are actuated to engage the pipe and at the same time the elevation of the elevator beam is adjusted (downwards) so as to minimise relative movement between the wedge insert and the pipe.
(h) Hydraulic pressure to the static clamp 58 is reversed and the mobile clamp 60 is raised to zero stroke to disengage the static clamp and lock the mobile clamp 60. Tension readings are again checked to ensure 100% load transfer from the static clamp 58 to the mobile clamp 60; i.e. to ensure that the mobile clamp 60 is locked.
(i) The wedges of the static clamp 58 are released and the clamp 58 opened to its working clearance. This returns the system to its initial status (a). The cycle (a) to (i) is repeated as necessary, deploying the pipeline by a length equal to the stroke length of the mobile clamp 60 on each cycle.

As noted at (d) and (h) above, both clamps 58 and 60 are provided with devices adapted to provide an accurate measure of the applied load (tension) on each of the clamps. Loading must be accurately monitored during all phases of the deployment cycle to avoid any possibility of clamp release under load. The control system for the operation of the clamps preferably includes interlocks to prevent the release of the hydraulic pressure applied to the clamp wedges until the load on the clamp falls below a predetermined limit. Load transfer is complicated by the lack of fine control in positioning the elevated beam. Despite this, it is possible to transfer practically 100% of the catenary top tension load and may in addition include the self weight of the elevated clamp (10 tonnes).

The sequence of actions for transferring load from the mobile clamp 60 to the static clamp 58 is as follows:

Initially, mobile clamp locked, static clamp open.

Actuate static clamp wedges.

Lower mobile clamp slowly while monitoring load on both clamps.

Stop lowering mobile clamp when load on static clamp reaches predetermined level (e.g. 100% of total).

Hold for brief period (e.g. five seconds) while monitoring load on both clamps.

If there is no reduction in the static clamp load, release pressure on mobile clamp wedges.

Continue to lower mobile clamp to free mobile clamp wedges.

Open mobile clamp.

The sequence of actions for transferring load from the static clamp 58 to the mobile clamp 60 is as follows:

Initially, static clamp locked, mobile clamp open.

Actuate mobile clamp wedges.

Raise mobile clamp slowly while monitoring load on both clamps.

Stop raising mobile clamp when load on mobile clamp reaches predetermined level (e.g. 100% of total).

Hold for brief period (e.g. five seconds) while monitoring load on both clamps.

If there is no reduction in the mobile clamp load, release pressure on static clamp wedges.

Continue to raise mobile clamp to free static clamp wedges.

Open static clamp.

These sequences are followed whenever load is transferred from the mobile to static or static to mobile clamps in the various operational procedures described herein.

FIGS. 22(*a*) to (*h*) illustrate the sequence of clamp operations for welding and deployment of second and subsequent pipe stalks, including the procedure for passing field joints, buckle arrestors, anodes or the like.

(a) Initially, the previously deployed pipe is held in the static clamp 58 with its upper end projecting above the weld deck (suitably by approximately 1500 mm). The static clamp 58 is locked with its upper and lower guides engaged (i.e. at working clearance of about 5 mm around the pipe). The mobile clamp 60, not shown but situated above pipe 208, is open and at maximum stroke with its lower guide in stand-by position. The next pipe stalk has been loaded into the lay line and lowered on the trolley to a short distance (e.g. 100 mm) above the previously deployed pipe 208, as previously described. The pipe 208 is centred on the mobile clamp using adjustments of the trolley and the mid mast clamp and the mobile clamp raised to zero stroke. The ILUC is deployed, most of the way initially, then subsequently over the last two metres, the pipe is lowered on the trolley and the lower guide of the mobile clamp 60 is actuated to mate and align the pipe faces for welding and the ILUC is actuated to lock the pipes together.

(b) Welding, NDT and FJC are completed as previously described, the lower guide of the mobile clamp 60 is returned to stand-by, load is transferred from the hoist wire, the ILUC is deactivated and recovered, so that the mast trolley is free to raise the next pipe stalk to its stand-by position on the mast. The pipestring including the new stalk 208 is held by the static clamp 58 and the upper guide 80 of the static clamp is opened (to its working retracted position).

(c) The load is transferred to the mobile clamp 60 as previously described.

(d) The mobile clamp 60 is lowered until the field joint 210 passes through the open upper guide 80 and into the centre of the open static clamp 58, lateral movement of the pipe being restrained by the lower guide 82.

(e) The upper guide 80 is engaged.

(f) The lower guide 82 is opened (working retracted position).

(g) The mobile clamp 60 is lowered to pass the field joint 210 clear of the static clamp 58.

(h) The lower guide 82 is re-engaged and the mobile clamp 60 lowered to maximum stroke. The static clamp 58 is re-engaged and load transferred from the mobile clamp. The mobile clamp can then be raised for the next deployment cycle as described previously.

This sequence is applicable to field joints, as described, and also to passing other projections such as anodes and buckle arrestors with an outside diameter less than the working clearance provided by retracting the guides and opening the clamps to their working retracted positions (about 50 mm greater than the pipe diameter in this example). Larger projections require the static clamp assembly 58 to be split (fully retracted) and withdrawn as previously described.

FIGS. 21(*a*) to (*h*) illustrate the sequence for abandonment of the pipestring in the absence of a pipeline end manifold (PLEM) or other large diameter end fitting.

(a) Initially, the upper end of the last stalk 212 of the pipestring is held by the mobile clamp 60 at its maximum height (zero stroke). The static clamp 58 is open.

(b) The mobile clamp 60 is lowered to maximum stroke, so that the pipe end projects about 1500 mm above the weld deck. Load is then transferred to the static clamp 58.

(c) The mobile clamp is raised to zero stroke, clear of the work area.

(d) A termination head 214 is welded to the end of the pipeline.

(e) Abandonment and Recovery (A&R) gear is deployed (A&R winch, wire, sheaves etc.) and the A&R wire 216 is connected to the termination head 214.

(f) Load is transferred from the static clamp 58 to the A&R wire 216. Hydraulic pressure is released from the static clamp wedges and the A&R wire 216 is pulled back slightly to free the wedges. The clamp 58 is opened.

(g) If necessary (i.e. if additional clearance is required), the static clamp assembly 58 is split and withdrawn.

(h) The A&R wire 216 is paid out by lowering away on the A&R winch to abandon the pipe.

The nature and use of A&R equipment and procedures as such are well known in the art and will not be described in greater detail herein, other than in relation to features specific to the present invention.

Pipeline recovery procedures are essentially the reverse of the foregoing. The static clamp is split and withdrawn. With the vessel on station, the A&R wire is deployed through the moon-pool and connected to the termination head. The mobile clamp is open and at zero stroke.

The A&R wire is recovered to draw the pipe end up through the moon-pool to a position where the weld between pipe and pull head is situated about 1500 mm above the weld deck.

The static clamp 58 assembly is deployed and closed around the pipe.

The static clamp is actuated and load is transferred from the A&R wire to the static clamp by easing tension on the wire until 100% of load is taken by the static clamp.

Load on the static clamp is monitored for a brief period (e.g. one minute).

If there is no reduction in the static clamp load, the A&R wire is disconnected and de-rigged.

The termination head is cut off and the pipe end prepared for welding.

The mobile clamp 60 is lowered over the pipe end.

The connection and deployment of further pipe stalks may then proceed as previously described.

Alternatively, if the pipeline is to be removed or repaired, then recovery can proceed by transferring the load from the static to the mobile clamp, deploying the pipe hoisting headclamp and attaching to the recovered pipe end, and applying the basic deployment cycle in reverse whilst maintaining sufficient tension on the hoisting wire to guide the recovered pipe.

FIGS. 23(a) to (l) illustrate a procedure for applying Vibration Induced Vortex (VIV) strakes to the pipeline. VIV strakes are devices for promoting vortex-shedding, as is well known in the art. This procedure uses strakes which are approximately 3 metres in length. Shorter or longer strakes may be used depending on the static clamp 58 which may require to clamp onto a section of the pipe where there are no strakes at some point during the mobile clamp cycle. Typical alternative strakes may be 1.5 m in length.

(a) Initially, the pipe 218 is held by the mobile clamp 60, at zero stroke. The static clamp 58 is open.

(b) The static clamp 58 is split and withdrawn. A first 3 m strake section 220 is fitted to the pipe with 2 m extending above the weld deck and 1 m below.

(c) The mobile clamp 60 is lowered to close to maximum stroke, so that the first strake section 220 is lowered clear of the working position of the static clamp assembly 58 and with its upper end slightly below the level of the main deck. The static clamp assembly 58 is repositioned and the load transferred from the mobile clamp 60 to the static clamp 58.

(d) The mobile clamp 60 is raised to zero stroke, load is transferred from the static clamp 58 to the mobile clamp 60, and the static clamp is split and withdrawn.

(e) Second and third strake sections 222 and 224 are fitted to the pipe above the first section 220. The second section 222 is fitted at the weld deck and lowered along the pipe to engage with the first section. The third section is then fitted on top of the second section and secured to the pipe.

(f) The mobile clamp is lowered to close to maximum stroke. The dimensions of the strake sections in relation to the mobile clamp stroke (3 m strake section, 5.8 m maximum clamp stroke in this example) is such that the third strake section is lowered below the main deck level, clear of the static clamp working position. The static clamp is then repositioned and load transferred thereto from the mobile clamp.

(g) The mobile clamp 60 is raised to zero stroke, load is transferred thereto and the static clamp 58 is split and withdrawn.

(h)–(i) Fourth and fifth strake sections 226 and 228 are fitted in a manner similar to the second and third sections, lowered, the static clamp repositioned and load transferred thereto as before.

(j)–(k) In this particular example, the relative dimensions of the strake sections and the mobile clamp stroke are such that, following the fourth and fifth sections, a single sixth strake section 230 is fitted on the next cycle, prior to the pipe being lowered, the static clamp repositioned and load transferred thereto.

(l) On the following cycle, seventh and eighth strake sections 232, 234 can be fitted.

This sequence can be repeated as required for further strake sections.

In some pipelay operations, the pipestring may include a tapered transition section, having a frusto-conical external profile. In this case, the pipe-engaging inserts of one or both of the clamps (depending on the size and location of the transition section within the pipestring) may be replaced with tapered inserts matching the profile of the transition section prior to the transition section entering the clamps.

Where the pipeline is required to be initiated with a pipeline end manifold (PLEM) at the leading (downstream) end of the pipestring, the following procedure may be employed:

initially, the initiation wire is recovered into the moon-pool and made fast (as previously described with reference to FIG. 19). The mobile clamp is at its maximum height (zero stroke), the mobile clamp is open and the static clamp is split and withdrawn. The A&R gear is rigged and the A&R wire reeved.

The PLEM, mounted on a supporting deck, is skidded into position over the moon-pool.

The initiation wire is attached to the bottom of the PLEM.

The A&R wire is attached to the top of the PLEM and the weight taken on the A&R winch.

The PLEM deck is opened and skidded out from beneath the PLEM.

The PLEM is lowered into the moon-pool on the A&R winch.

The static clamp assembly is repositioned, closed and actuated to grip the "end stub" of the PLEM.

Load is transferred from the A&R winch to the static clamp.

The A&R wire is disconnected and de-rigged.

The mobile clamp is lowered to maximum stroke.

The first pipe stalk is positioned in the mast and lowered on the hoist until its lower end is just above the mobile clamp.

The line up rollers are engaged and align the pipe.

The mobile clamp is actuated to steady the pipe for welding.

An end connector (flange) is connected to the end of the pipe (if not previously fitted).

The mobile clamp is released and opened (the pipe is still held on the hoist wire).

The pipe is lowered on the hoist wire to align the connecting flanges on the PLEM and pipe (the lower guide of the mobile clamp may be employed to align the flanges).

The pipe and PLEM flanges are connected.

The mobile clamp is raised to its zero stroke position and actuated to grip the pipe above the PLEM and load is transferred from the static clamp to the mobile clamp.

The static clamp is released, opened, split and withdrawn.

The mobile clamp is lowered close to maximum stroke, so that the flange connection between the PLEM and the pipe is lowered clear of the working position of the static clamp.

The static clamp is repositioned, closed and activated around the pipe above the flange connection.

Load is transferred from the mobile clamp to the static clamp.

Pipeline deployment may then proceed in the manner previously described.

Where the pipeline is required to be abandoned with a pipeline end manifold (PLEM) at the trailing (upstream) end of the pipestring, the following procedure may be employed:

Initially, the deployed pipeline is held by the static clamp, with its trailing end about 1500 mm above the weld deck. The static clamp is locked with its upper and lower guides engaged. The mobile clamp is raised to zero stroke. The A&R gear is rigged and the A&R wire reeved.

A connecting flange is welded to the trailing end of the pipeline (if not previously fitted) and a padeye (abandonment) head fitted thereto.

The A&R wire is connected to the padeye.

Load is transferred from the static clamp to the A&R wire.

The static clamp is opened and released.

The pipe is lowered on the A&R wire until the flange is in position, just above the static clamp, for the PLEM.

The static clamp is actuated and load is transferred from the A&R wire to the static clamp.

The A&R wire is disconnected from the padeye and the padeye removed.

The PLEM is skidded into position on a supporting deck and adjusted on jacks incorporated in the supporting deck to mate the PLEM and pipe connecting flanges.

The flanges are connected.

The A&R wire is connected to the top of the PLEM and load is transferred from the static clamp to the A&R winch.

The PLEM support deck is skidded clear.

The static clamp assembly is released, split and withdrawn.

The A&R wire is paid out to abandon the PLEM and pipeline.

The invention provides a J-Lay pipelaying system which is relatively simple and compact, and which is capable of being fitted temporarily to any suitable vessel.

Improvements and modifications may be incorporated without departing from the scope of the invention.

What is claimed is:

1. Marine pipelay apparatus for use on a vessel, comprising:

a main supporting structure adapted to be mounted at a main deck level of a vessel;

a pipe connecting station including means for connecting a lowermost end of a raised pipe stalk to an uppermost end of a previously launched pipeline mounted in said main supporting structure;

pipe support means comprising a tower extending upwardly above said pipe connecting station for maintaining a raised pipe stalk at an angle determined by a required lay line with its lowermost end aligned with said pipe connecting station;

first, static clamp means for releasably securing an uppermost end of a previously launched pipeline in alignment with said pipe connecting station; and pipe launching means for controllably launching said raised pipe stalk when said first clamp means is released, comprising second, mobile clamp means adapted to be releasably secured to the pipeline and elevator means whereby said second clamp means may be raised and lowered controllably over a predetermined stroke distance between a first, uppermost, zero stroke position and a second, lowermost, maximum stroke position; and wherein:

said tower and said pipe launching means are pivotally mounted on said main supporting structure, said main supporting structure being adapted to be mounted at said main deck level of said vessel for fore/aft movement relative thereto and said static clamp means is pivotally mounted on a hang-off structure adapted to be mounted at said main deck level of said vessel for fore/aft movement relative thereto independently of said fore/aft movement of said main supporting structure.

2. Apparatus as claimed in claim 1, wherein said tower is mounted for pivotable movement about a first horizontal, port/starboard axis whereby said predetermined angle may be adjusted within a predetermined range, said mobile clamp means being mounted for pivotable movement about said first axis for alignment with said lay line, and said static clamp means is mounted for pivotable movement about a second horizontal, port/starboard axis parallel to said first axis.

3. Apparatus as claimed in claim 1, wherein the pipeline may be gripped alternately by said first and second clamp means, the pipeline being launched from the vessel in a stepwise manner by means of a repeating cycle comprising applying said first clamp means to the pipeline while the second clamp means is being raised towards its zero stroke position, transferring the load of the pipeline from the first clamp means to the second clamp means, and lowering the second clamp means towards its maximum stroke position.

4. Apparatus as claimed in claim 1, wherein the static clamp means is located beneath said pipe connecting station and said mobile clamp means is located above the static clamp, the uppermost position of the mobile clamp being above the level of the pipe connecting station and the lowermost position of the mobile clamp being below the level of the pipe connecting station.

5. Apparatus as claimed in claim 1, wherein said mobile clamp means includes a pipe clamping device mounted on a supporting beam structure and said elevator means comprises a plurality of hydraulic jacks connected to said supporting beam structure and operable to raise and lower said supporting beam structure relative to said static clamp means.

6. Apparatus as claimed in claim 1, wherein said tower means is adapted to support a first pipe stalk in a stand-by position extending substantially parallel to said lay line.

7. Apparatus as claimed in claim 6, further including pipe-handling means adapted to raise a pipe stalk into said stand-by position and subsequently to shift said pipe stalk from said stand-by position into alignment with said lay line.

8. Apparatus as claimed in claim 1, further including pipe handling means for raising a pipe stalk onto said tower.

9. Apparatus as claimed in claim 8, wherein said pipe-handling means includes a horizontal, elongate platform adapted to be located so as to extend in the fore/aft direction between the stern of the vessel and said main supporting structure, said platform being adapted to support a pipe stalk prior to said pipe stalk being raised onto said tower, pipe storage bays extending in the fore/aft direction on either side of said platform, and pipe lifting means comprising a traversing beam extending in the fore/aft direction and mounted for transverse port/starboard movement above said platform and said storage bays, said traversing beam including pipe hoisting means adapted to lift pipe from both the port and starboard sides of said traversing beam between said pipe storage bays, said traversing beam and said platform.

10. Apparatus as claimed in claim 8, wherein said pipe-handling means includes a pipe-hoisting device which is adapted to be raised and lowered relative to said pipe supporting means, said device including:
   pipe hoisting means;
   a main body portion adapted for connection to said pipe hoisting means;
   pipe clamping means connected to said main body portion and adapted to engage an outer surface of one end of a pipe stalk, said pipe clamping means being adapted for pivotable movement relative to said main body portion about a horizontal port/starboard axis;
   a housing mounted on said main body portion and including winch means adapted for connection to an internal line up clamp (ILUC), such that said ILUC may be stored in said housing and deployed therefrom, through said clamping means and along the interior of a pipe stalk gripped by said clamping means.

11. Apparatus as claimed in claim 10, wherein said clamping means and housing are connected to said body portion by actuating means operable to effect movement of said clamping means and said housing relative to said body portion in a fore/aft direction between a first stand-by position and a second position in which said clamping means is aligned with said lay line.

12. A marine pipelay vessel equipped with pipelay apparatus as claimed in claim 1.

13. A marine pipelay vessel as claimed in claim 12, wherein said lay-line extends through a moon-pool formed in the vessel.

14. A marine pipelaying apparatus for use on a vessel, the apparatus comprising:
   a main supporting structure mounted at a main deck of the vessel and adapted for fore/aft movement relative thereto;
   a pipe connecting station mounted on the main supporting structure, the pipe connecting station connecting sections of pipe together to form a pipeline;
   a tower mounted on the main supporting structure and extending above the pipe connecting station, the tower configured to maintain a section of pipe to be connected to the pipeline at an angle determined by a lay line;
   a hang-off structure mounted at the main deck of the vessel and adapted for fore/aft movement relative thereto and independently of the fore/aft movement of the main supporting structure;
   a clamp mounted on the hang-off structure, the clamp being operable to releasably secure an uppermost end of the pipeline at the pipe connecting station; and
   a pipe launcher mounted on the main supporting structure, the pipe launcher adapted to controllably launch the pipeline when the clamp is released.

15. The apparatus as claimed in claim 14, wherein the clamp is a first clamp and the pipe launcher comprises:
   a second clamp above the first clamp and the second clamp being adapted to be releasably secured to the pipeline; and
   an elevator adapted to raise and lower the second clamp on the tower over a predetermined stroke distance.

16. The apparatus as claimed in claim 15, wherein the tower is pivotable about a first horizontal, port/starboard axis so as to adjust the angle determined by the lay line within a predetermined range, the second clamp is pivotable about the first axis so as to place the second clamp into alignment with the lay line, and the first clamp is pivotable about a second horizontal, port/starboard axis parallel to the first axis.

17. The apparatus as claimed in claim 15, wherein the first clamp is operable to grip the pipeline while the second clamp is raised, the first and second clamps are operable to transfer the load of the pipeline from the first clamp to the second clamp when the section of pipe is connected to the pipeline, and the second clamp is operable to launch the pipeline from the vessel by lowering the second clamp.

18. The apparatus as claimed in claim 15, wherein the first clamp is located beneath the pipe connecting station and the second clamp is located above the first clamp, the second clamp having an uppermost position above the pipe connecting station and a lowermost position below the pipe connecting station.

19. The apparatus as claimed in claim 15, wherein the second clamp includes a pipe clamping device mounted on a supporting beam structure and the elevator comprises a plurality of hydraulic jacks connected to the supporting beam structure and operable to raise and lower the supporting beam structure relative to the first clamp.

20. The apparatus as claimed in claim 14, wherein the tower is adapted to support a first pipe section in a stand-by position substantially parallel to the lay line.

21. The apparatus as claimed in claim 20, further comprising:
   a pipe-handling member adapted to raise a pipe stalk into the stand-by position and shift the pipe stalk from the stand-by position into alignment with the lay line.

22. The apparatus as claimed in claim 14, further comprising a pipe handling member that raises a pipe section onto the tower.

23. The apparatus as claimed in claim 22, wherein the pipe-handling member includes:
   a platform which extends in the fore/aft direction between a stern of the vessel and the main supporting structure, the platform being adapted to support the pipe section prior to the pipe section being raised onto the tower;
   pipe storage bays extending in the fore/aft direction on either side of the platform; and
   a pipe lifter having a traversing beam extending in the fore/aft direction and mounted for transverse port/starboard movement above the platform and the storage bays, the traversing beam including a pipe hoist adapted to lift pipe from the pipe storage bays.

24. The apparatus as claimed in claim 22, wherein the pipe-handling member includes a pipe-hoisting device which is adapted to be raised and lowered relative to the main supporting structure, the hoisting device including:
   a pipe hoisting member;
   a main body portion adapted for connection to the pipe hoisting member;
   a pipe clamp connected to the main body portion and adapted to engage an outer surface of one end of the pipe section, the pipe clamp adapted for pivoting movement relative to the main body portion about a horizontal port/starboard axis;
   a housing mounted on the main body portion; and
   an internal line up clamp stored in the housing, the internal line up clamp being deployed from the housing and through the pipe clamp so as to engage the interior of the pipe section gripped by the pipe clamp.

25. The apparatus as claimed in claim 24, wherein the pipe clamp and housing are moveable relative to the body portion in a fore/aft direction between a first stand-by position and a second position in which the pipe clamp is aligned with the lay line.

26. The apparatus as claimed in claim 14, wherein the lay-line extends through a moon-pool formed in the vessel.

* * * * *